(12) United States Patent
Ishikawa et al.

(10) Patent No.: US 7,943,884 B2
(45) Date of Patent: May 17, 2011

(54) GAS CONTAINER AND METHOD OF PRODUCING THE SAME

(75) Inventors: Takeshi Ishikawa, Toyota (JP);
Masaaki Amano, Kariya (JP);
Masahiko Ota, Inazawa (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 513 days.

(21) Appl. No.: 11/884,083

(22) PCT Filed: Feb. 20, 2006

(86) PCT No.: PCT/JP2006/303514
§ 371 (c)(1),
(2), (4) Date: Aug. 9, 2007

(87) PCT Pub. No.: WO2006/093059
PCT Pub. Date: Sep. 8, 2006

(65) Prior Publication Data
US 2008/0223735 A1 Sep. 18, 2008

(30) Foreign Application Priority Data

Mar. 2, 2005 (JP) .................................. 2005-057089
Mar. 7, 2005 (JP) .................................. 2005-062584
Dec. 26, 2005 (JP) .................................. 2005-371931

(51) Int. Cl.
*B23K 26/20* (2006.01)
(52) U.S. Cl. ................................. 219/121.64
(58) Field of Classification Search ............... 219/121.6, 219/121.64, 121.66; 156/69, 272
See application file for complete search history.

(56) References Cited

U.S. PATENT DOCUMENTS

| | | | |
|---|---|---|---|
| 3,769,117 A * | 10/1973 | Bowen et al. ................. | 156/69 |
| 4,579,242 A | 4/1986 | Ellis, III | |
| 6,227,402 B1 | 5/2001 | Shimojima et al. | |
| 6,862,944 B2 * | 3/2005 | Savitski ....................... | 73/865.8 |
| 2003/0111473 A1 | 6/2003 | Carter et al. | |
| 2004/0084140 A1* | 5/2004 | Kobayashi ................. | 156/272.8 |

FOREIGN PATENT DOCUMENTS

| | | |
|---|---|---|
| CN | 85 2 05076 U | 11/1985 |
| DE | 41 05 787 A1 | 11/1992 |
| DE | 197 11 844 A1 | 9/1998 |
| DE | 100 17 021 A1 | 10/2001 |
| JP | 48-78280 A | 10/1973 |
| JP | 57-8112 A | 1/1982 |
| JP | 6-510354 A | 11/1994 |
| JP | 7-506414 A | 7/1995 |
| JP | H11-13992 A | 1/1999 |
| JP | 2000-334589 A | 12/2000 |
| JP | 2001-277364 A | 10/2001 |

(Continued)

*Primary Examiner* — M. Alexandra Elve
*Assistant Examiner* — Thien Tran
(74) *Attorney, Agent, or Firm* — Kenyon & Kenyon LLP

(57) ABSTRACT

An object is to provide a gas container and a method of producing the gas container in which liner constituting members can appropriately be joined to each other and productivity can be improved. A gas container has a resin liner constituted by joining a plurality of liner constituting members, the liner constituting members each having at least a hollow cylindrical part, and a reinforcement layer arranged on an outer periphery of the resin liner. Joining portions of the liner constituting members are joined to each other over a circumferential direction by laser welding, and the joining portions are made of a laser transmitting resin and a laser absorbing resin, respectively.

32 Claims, 19 Drawing Sheets

FOREIGN PATENT DOCUMENTS

| | | | |
|---|---|---|---|
| JP | 2002-283457 | * | 10/2002 |
| JP | 2002-283457 A | | 10/2002 |
| JP | 2002-331588 A | | 11/2002 |
| JP | 2003-001708 | * | 1/2003 |
| JP | 2003-1708 A | | 1/2003 |
| JP | 2003-136600 | * | 5/2003 |
| JP | 2003-136600 A | | 5/2003 |
| JP | 2003-251699 A | | 9/2003 |
| JP | 2004-19773 A | | 1/2004 |
| JP | 2004-074734 | * | 3/2004 |
| JP | 2004-74734 A | | 3/2004 |
| JP | 2004-188802 A | | 7/2004 |
| JP | 2004-209916 A | | 7/2004 |
| JP | 2004-211783 A | | 7/2004 |
| JP | 2005-036068 | * | 2/2005 |
| JP | 2005-36068 A | | 2/2005 |
| JP | 2005-279955 A | | 10/2005 |
| WO | WO 92/20954 A1 | | 11/1992 |
| WO | WO 03/031860 | * | 3/2003 |
| WO | WO 03/031860 A1 | | 4/2003 |
| WO | WO 2005/015074 A1 | | 2/2005 |

* cited by examiner

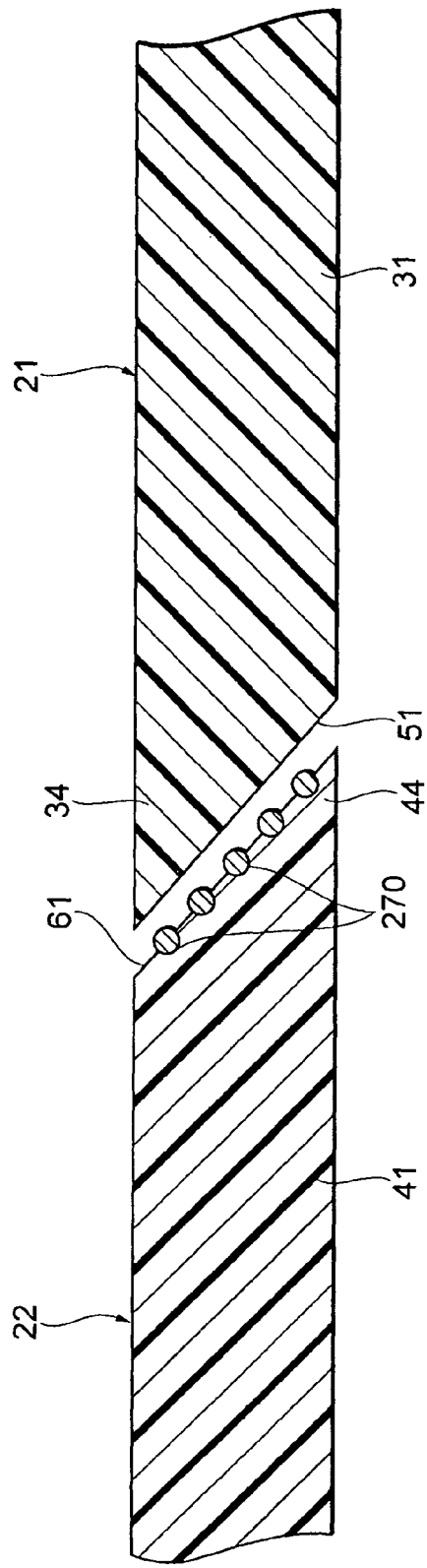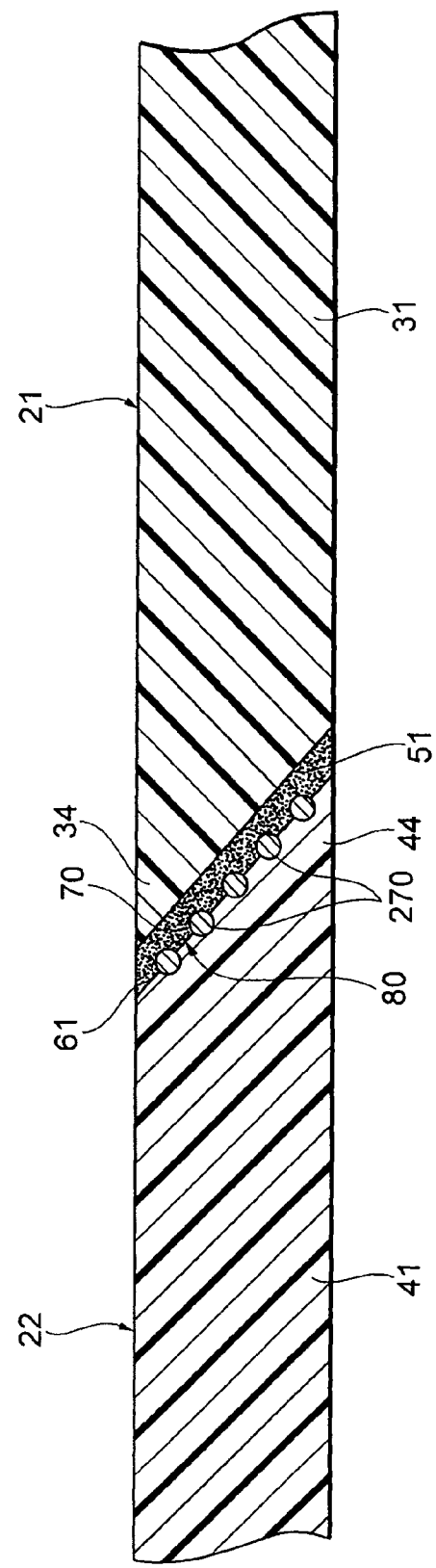

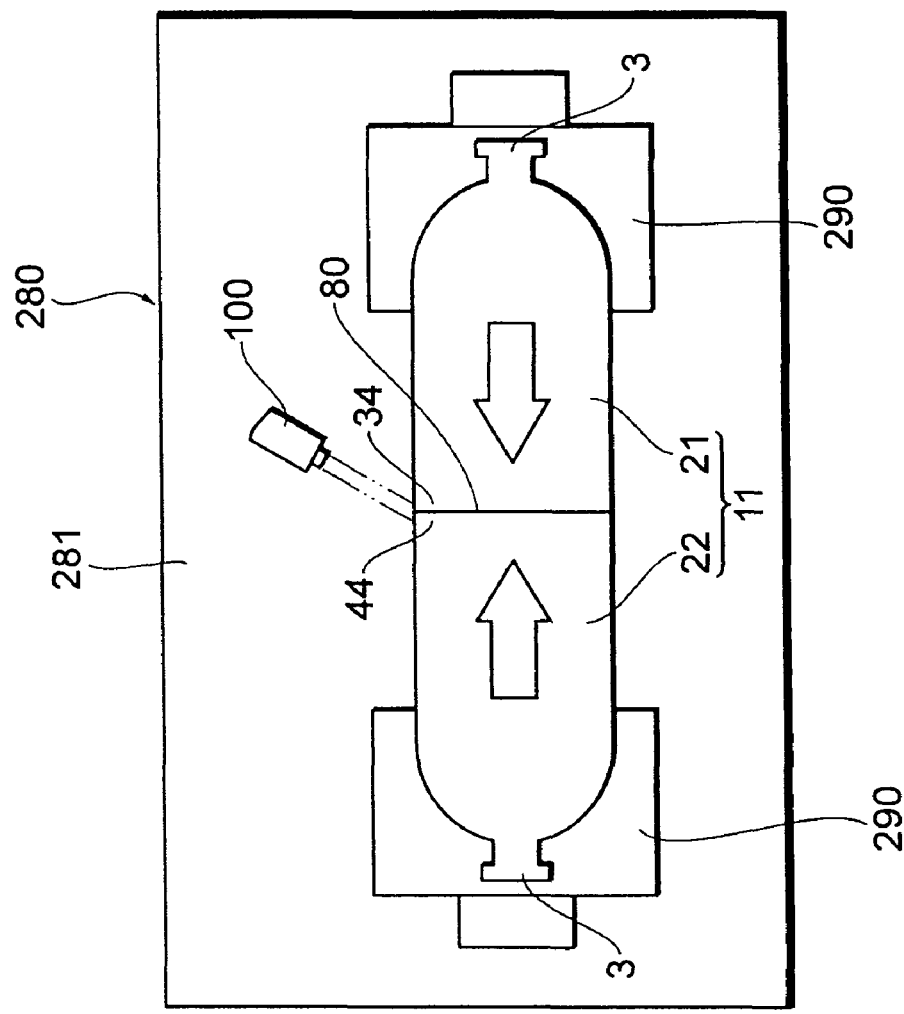

GAS CONTAINER AND METHOD OF PRODUCING THE SAME

This is a 371 national phase application of PCT/JP2006/303514 filed 20 Feb. 2006, claiming priority to Japanese Patent Applications No. 2005-057089 filed 02 Mar. 2005, Ser. No. 2005-062584 filed 07 Mar. 2005, and Ser. No. 2005-371931 filed 26 Dec. 2005, respectively, the contents of which are incorporated herein by reference.

TECHNICAL FIELD

The present invention relates to a gas container to store a gas such as hydrogen. More particularly, it relates to a gas container including a resin liner constituted by joining a plurality of liner constituting members, and a method of producing the gas container.

BACKGROUND ART

Heretofore, as a gas container to store hydrogen or a compressed natural gas (CNG), from a viewpoint of lightening or the like, a container has been developed in which an inner shell is constituted of a resin liner and an outer peripheral surface of the resin liner is reinforced by a reinforcement layer (an outer shell) such as FRP or the like. As this type of resin liner, for example, a pair of bowl-like liner constituting members (substantially cylindrical members) are formed of a thermoplastic resin such as polyethylene beforehand, and end portions of this pair of liner constituting members are joined by heat plate welding (e.g., see JP 2004-211783 A (FIGS. 2 and 5)).

DISCLOSURE OF THE INVENTION

However, in a method of joining the liner constituting members to each other by the heat plate welding, much time and cost have been required for manufacturing a resin liner. In a heat plate welding process, melting burrs are easily generated. In addition, it has been difficult to control positioning precision between the liner constituting members. Furthermore, the liner constituting members are sometimes deformed by an influence of heating, and it has been difficult to control heat. Especially, when very thin liner constituting members are joined to each other by the heat plate welding, surface burn and excess and deficiency of melting of a resin might be generated.

An object of the present invention is to provide a gas container and a method of producing the gas container, in which liner constituting members can appropriately be joined to each other and productivity can be improved.

To achieve the above object, a gas container of the present invention has a resin liner constituted by joining a plurality of liner constituting members, the liner constituting members each having at least a hollow cylindrical part, and a reinforcement layer arranged on an outer periphery of the resin liner. Joining portions of the plurality of liner constituting members are joined to each other by laser welding.

Another gas container of the present invention for achieving the above object has a resin liner constituted by joining a plurality of liner constituting members, the liner constituting members each having at least a hollow cylindrical part, and a reinforcement layer arranged on an outer periphery of the resin liner. A join part joined to a joining portion of one liner constituting member and a joining portion of another liner constituting member has a laser welding part constituted by joining these joining portions to each other by laser welding.

According to these constitutions, since in a manufacturing process of the resin liner, a joining portion of the one liner constituting member is joined to a joining portion of the other liner constituting member by the laser welding, the resin liner can be constituted in a short time with low cost. Therefore, productivity of the gas container can be improved. Since the joining portions can locally be heated at a low temperature by use of the laser welding, a thermally influenced portion of each liner constituting member can be minimized, and melting burrs and the like are not generated.

Here, "the liner constituting members each having at least a hollow cylindrical part (one end side)" includes that the liner constituting member has as a whole a cylindrical, annular, bowl-like or domed shape or the like. For example, when the resin liner is constituted of a pair of (half divided) liner constituting members, each liner constituting member is formed into a bowl shape as a whole. When three or more liner constituting members constitute the resin liner, opposite-end liner constituting members of the resin liner are formed into the bowl shape as a whole, and the liner constituting member positioned between these members is formed into a hollow cylindrical or annular shape as a whole.

According to one aspect of another gas container of the present invention, it is preferable that the join part has a heat generating material disposed integrally with the laser welding part or near the laser welding part.

With this constitution, since the melting of the joining portions can be promoted by the heat generating material during the laser welding, a welding defect between the joining portions is suppressed, and the portions can further satisfactorily be joined.

Here, it is preferable that the heat generating material is disposed on at least one of the joining portions before manufacturing of the resin liner (before the laser welding). The heat generating material disposed integrally with the laser welding part indicates, for example, that the heat generating material could be included in a resin of the joining portion melted by the laser welding after the manufacturing of the resin liner (after the laser welding). On the other hand, the heat generating material disposed near the laser welding part indicates, for example, a state in which the material is not included in the resin of the joining portion melted by the laser welding and is disposed near this melted and solidified resin after the manufacturing of the resin liner (after the laser welding).

According to one aspect of the present invention, it is preferable that the joining portions are joined to each other over a circumferential direction of the resin liner by the laser welding.

With this constitution, the whole periphery of the joining portions is linearly welded by laser. In consequence, leak of a gas from a joint between the joining portions is inhibited, and air-tightness of the resin liner can appropriately be secured.

According to one aspect of the present invention, it is preferable that the joining portion of one of the liner constituting members to be joined to each other is constituted of a laser transmitting member, and the joining portion of the other liner constituting member is constituted of a laser absorbing member.

Alternatively, it is preferable that one of the liner constituting members joined to each other is constituted of a laser transmitting member, and the other liner constituting member is constituted of a laser absorbing member.

With these constitutions, when in a manufacturing process of the resin liner, a laser transmitting joining portion side is irradiated with the laser, the laser absorbing joining portion is heated and melted. Moreover, the laser transmitting joining portion is heated and melted owing to heat conduction from the joining portion. In consequence, when the joining portion is provided with a laser transmitting or absorbing property, the joining portions can appropriately be joined to each other. This type of characteristic with respect to the laser may be imparted to the only joining portion, but when the characteristic is imparted to the whole liner constituting member including the joining portion, the liner constituting member can easily be manufactured.

Preferably, the joining portion constituted of the laser transmitting member is positioned on the external of the resin liner, and the joining portion constituted of the laser absorbing member is positioned on the internal of the resin liner.

With this constitution, since the outside of the resin liner (the outside of the liner constituting member) is irradiated with the laser in the manufacturing process of the resin liner, the joining portions can easily be joined to each other. That is, in the manufacturing process of the resin liner, a laser irradiation device does not have to be positioned on the inner side of the liner constituting member, and the joining portions can be joined to each other with good operability. This is also useful for miniaturization of the resin liner.

Preferably, at least one of the plurality of liner constituting members has a communicating portion which connects a hollow inner portion of the resin liner to an outer portion on a side opposite to the joining portion to be joined to another liner constituting member.

With this constitution, the hollow inner portion of the resin liner can filled with a gas via the communicating portion, and the gas can be discharged from the hollow inner portion via the communicating portion.

Preferably, the joining portion of one of the liner constituting members to be joined to each other has a tilted first joining end surface, and the joining portion of the other liner constituting member has a second joining end surface tilted along the first joining end surface and joined to the first joining end surface by the laser welding.

Preferably, the gas container of the present invention is constituted so that a high-pressure combustible gas can be stored.

Preferably, the gas container of the present invention includes a container main body having the resin liner and the reinforcement layer, and a mouthpiece disposed at one end portion of the container main body.

To achieve the above object, a method of producing the gas container of the present invention is a method of producing a gas container having a resin liner constituted by joining a plurality of liner constituting members, the liner constituting members each having at least a hollow cylindrical part. The method has: a first step of constituting a joining portion of one of liner constituting members to be joined to each other by a laser transmitting member and constituting a joining portion of the other liner constituting member by a laser absorbing member; a second step of bringing the joining portions of the liner constituting members to be joined to each other into contact with each other after the first step; and a third step of irradiating the liner constituting members with laser from a side of the joining portion including the laser transmitting member to join, to each other, the joining portions brought into contact with each other by laser welding.

With this constitution, first a laser transmitting or absorbing property is imparted to the joining portion of the liner constituting member. In addition, while the joining portions are brought into contact with each other, the liner constituting member is irradiated with the laser from the side of the laser transmitting joining portion. When the liner constituting member is irradiated with the laser, the laser absorbing joining portion is heated and melted.

Moreover, the laser transmitting joining portion is heated and melted by heat conduction from the joining portion, and then cooled to solidify. In consequence, an interface between the joining portions is joined.

As described above, since the laser welding is used in joining the liner constituting members to each other, the resin liner can be constituted in a short time with low cost. Since the joining portions can locally be heated, a thermally influenced portion of the liner constituting member can be minimized, and melting burrs are not generated.

Preferably, the second step is performed by externally bringing the laser transmitting joining portion into contact with the laser absorbing joining portion, and the third step is performed by irradiating the liner constituting member with the laser from the side of the laser transmitting joining portion by a laser irradiation device arranged outside the liner constituting member.

With this constitution, the laser irradiation device does not have to be positioned on the inner side of the liner constituting member, and the joining portions can easily be joined to each other with good operability.

Preferably, the third step includes irradiating the liner constituting members with the laser in a state in which a pressure difference is applied between the inside and the outside of the two liner constituting members to be joined to each other.

With this constitution, in a state in which a close contact degree between the joining portions is improved owing to the pressure difference, the joining portions are joined to each other by laser welding. In consequence, a laser welding defect can be suppressed to improve joining precision. Since the joining precision is improved, strength and air-tightness of the resin liner can appropriately be secured.

Here, the application of the pressure difference may be stopped in a stage in which a joining reaction between the joining portions proceeds to a certain degree by the irradiation with the laser. In other words, for at least one period during the irradiation before start of the irradiation with the laser, the pressure difference may be applied.

More preferably, the application of the pressure difference in the third step is performed by regulating at least one of an inner pressure and an outer pressure of the two liner constituting members to be joined to each other.

More preferably, the application of the pressure difference in the third step is performed by bringing the two liner constituting members to be joined to each other into a substantially internally welded state to reduce a pressure of a substantially sealed space of the liner constituting members or pressurize the sealed space.

With this constitution, since the pressure of the sealed space in the two liner constituting members is regulated, the pressure difference can be applied more easily as compared with a case where the outer pressures of these liner constituting members are regulated.

Here, examples of the pressurization of the sealed space include a case where a compressed gas is injected into this space and a case where a gas at a temperature higher than an outside temperature of the sealed space is injected.

More preferably, the application of the pressure difference in the third step is performed by reducing the pressure of the sealed space or pressurizing the sealed space via a communicating portion disposed on at least one of the two liner constituting members to be joined to each other.

With this constitution, the pressure of the sealed space can be reduced or the space can be pressurized by effective use of the communicating portion. It is to be noted that after producing the gas container, the hollow inner portion of the resin liner can be filled with the gas via this communicating portion, or the gas can be discharged from the hollow inner portion via the communicating portion.

Preferably, the second step is performed by overlapping and arranging the joining portions of the two liner constituting members to be joined to each other in an axial direction of the liner constituting members, and bringing overlapped portions of the joining portions into contact with each other.

With this constitution, as compared with a case where the joining portions are simply butted, a contact area between the joining portions can be increased. Especially, since the overlapped portions come in contact with each other in the axial direction, a close contact force between the joining portions increases owing to the pressure difference applied during the laser welding, and joining precision between the joining portions can further be improved.

Preferably, the method further comprises, between the second step and the third step, a step of performing an annealing treatment in a state in which the joining portions of the two liner constituting members to be joined to each other are brought into contact with each other.

With this constitution, the liner constituting members self contract by the annealing treatment, and a close contact degree between the joining portions improves. In consequence, in a state in which the close contact degree between the joining portions improves, the joining portions can be subjected to the laser welding, and the joining precision of the portions can be improved. Since the close contact degree improves by the annealing treatment, a device such as a pump for applying the pressure difference can be miniaturized and simplified.

Preferably, the third step is performed by subjecting, to the laser welding, the joining portions brought into contact with each other over a circumferential direction of the liner constituting members while relatively rotating the two liner constituting members to be joined to each other with respect to the laser irradiation device.

With this constitution, since the two liner constituting members are relatively rotated with respect to the laser irradiation device, the whole periphery of the joining portions is linearly welded by the laser. In consequence, air-tightness of the resin liner can appropriately be secured.

Here, "relatively rotating" includes the rotating of the two liner constituting members to be joined, the rotating of the only laser irradiation device and the rotating of both of the members and the device in the same direction or a reverse direction. Especially, the rotating of the only two liner constituting members can be simplest for positioning and device constitutions.

Preferably, the third step is performed in a low oxygen atmosphere.

With this constitution, oxidation of the joining portion melted by the irradiation with the laser can be suppressed. In consequence, burn-and-stick due to the oxidation during the laser welding and a welding defect such as a laser transmission defect due to this burn-and-stick can be suppressed. Here, the low oxygen atmosphere is an oxygen atmosphere lower than that of atmospheric air, and examples of the atmosphere include an inactive gas atmosphere and a substantially vacuumed state.

Preferably, the first step is performed by constituting one of the liner constituting members to be joined to each other by a laser transmitting member, and constituting the other liner constituting member by a laser absorbing member.

With this constitution, since the whole liner constituting member including the joining portion is constituted as a member having a characteristic with respect to the laser, as compared with a case where the only joining portion is provided with such a characteristic, the liner constituting members can easily be manufactured.

Preferably, the method of producing the gas container of the present invention further comprises, after the third step, a step of shaving an outer peripheral surface of at least one of the two liner constituting members so that joints between the outer peripheral surfaces of the two liner constituting members joined by the laser welding are disposed on the same plane.

For example, when the joining portions are overlapped with each other in the axial direction as described above, bump portions could be generated at the outer peripheral surface of the joint. To solve the problem, since the method includes the above step, the outer peripheral surface of at least one liner constituting member is shaved. In consequence, the joint of this outer peripheral surface can have the same plane. Therefore, this is useful for, for example, disposing the reinforcement layer on the outer periphery of the resin liner.

Preferably, the method of producing the gas container of the present invention further comprises: a preliminary heating step of preliminarily heating at least one of the two liner constituting members to be joined to each other, and the third step is executed during or after the preliminary heating step.

In consequence, since the preliminary heating is performed prior to the laser welding, surface burn can be suppressed during the laser welding. When the preliminarily heated member is irradiated with the laser, a time required for the laser welding can be reduced, and an output If the laser does not have to be increased more than necessary.

Here, a direct target to be subjected to the preliminary heating may be both of the liner constituting members as joining targets, but may be only one of the liner constituting members. A reason for the latter is that the liner constituting members are brought into contact with each other during the laser welding. Therefore, owing to the heat conduction form the preliminarily heated liner constituting member, even the liner constituting member which is not preliminarily heated can be brought into a preheated state during the laser welding.

Preferably, the preliminary heating step is performed by preliminarily heating at least one of the joining portion of one of the liner constituting members to be joined to each other and the joining portion of the other liner constituting member.

In consequence, since the joining portion as a target of the laser welding is locally preliminarily heated, in the preliminary heating step, a thermal influence such as thermal deformation of the whole liner constituting member can preferably be suppressed. Moreover, a necessary quantity of heat can be reduced.

Preferably, the preliminary heating step is performed by preliminarily heating the joining portions brought into contact with each other.

In consequence, since the heat conduction between the joining portions can further be promoted, the preliminary heating can efficiently be performed.

More preferably, the preliminary heating step is performed by heating the joining portions brought into contact with each other from at least one of the inside and the outside of the liner constituting members brought into contact with each other.

More preferably, the preliminary heating step is performed by preliminarily heating the joining portions brought into contact with each other over a circumferential direction while relatively rotating the liner constituting members brought into contact with each other with respect to a preliminary heating device having a heat source.

In consequence, the whole periphery of the joining portions can preliminarily be heated.

Here, "relatively rotating" includes the rotating of the liner constituting members with each other, the rotating of the only preliminary heating device and the rotating of both of the members and the device in the same direction or a reverse direction.

More preferably, the third step is performed by preliminarily heating the joining portions brought into contact with each other over a circumferential direction while relatively rotating the liner constituting members brought into contact with each other with respect to a laser irradiation device which irradiates the portions with the laser.

More preferably, the preliminary heating device is positioned on an upstream side of the laser irradiation device in a rotating direction of the liner constituting members brought into contact with each other.

With this constitution, when the liner constituting members are rotated with respect to each other, the joining portions are opposed to the preliminary heating device and preliminarily heated by this device, and the preliminarily heated portion is opposed to the laser irradiation device, and subjected to the laser welding by this device. In consequence, in a state in which a drop of a preliminary heating temperature of the joining portions is minimized, the joining portions can be joined to each other by the laser welding.

Preferably, the preliminary heating device which executes the preliminary heating step is at least one of a heater, a hot air device, a high-frequency induction heating device and the laser irradiation device.

With this constitution, the preliminary heating can be performed in a short time by, for example, the high-frequency induction heating device. When the same laser irradiation device is used in the preliminary heating step and the third step, the whole constitution of a producing device can be simplified. It is to be noted that when the same laser irradiation device is used, the portions may be irradiated with the laser with such a low output that the laser welding is not performed in the preliminary heating step.

Preferably, the method of producing the gas container of the present invention further comprises, prior to the preliminary heating step, a step of disposing a heat generating material on at least one of the joining portion of one of the liner constituting members to be joined to each other and the joining portion of the other liner constituting member.

In consequence, the preliminary heating of the joining portions can be promoted by the heat generating material. Moreover, melting of the joining portions during the laser welding can be promoted. In consequence, a welding defect between the joining portions can be suppressed, and the portions can further satisfactorily be joined to each other. It is to be noted that the heat generating material may be applied and disposed at the joining portion, and a sheet in which the heat generating material is kneaded may be attached and disposed at the joining portion.

More preferably, the heat generating material is at least one of a ceramic, graphite, a resin and a metal.

Preferably, the preliminary heating step is performed by preliminarily heating the joining portions in accordance with a measurement result of a water content measurement device which measures a water content of the joining portion of the liner constituting member.

When a water content ratio of the joining portion is high during the laser welding, the laser welding might be adversely affected. However, when the preliminary heating is executed in accordance with the measurement result of the water content measurement device as in the above constitution, the welding defect can be prevented.

In view of particulars for reaching the present invention, the present invention from another viewpoint is as follows.

Another method of producing a gas container of the present invention is a method of producing a gas container having a resin liner constituted by joining a plurality of liner constituting members, the liner constituting members each having at least a hollow cylindrical part, joining portions of the plurality of liner constituting members being irradiated with laser and joined by laser welding while or after the joining portions are preliminarily heated.

A still another method of producing a gas container of the present invention is a method of producing a gas container having a resin liner constituted by joining a plurality of liner constituting members, the liner constituting members each having at least a hollow cylindrical part, comprising: a preliminary heating step of preliminarily heating at least one of two liner constituting members to be joined to each other; and a laser irradiation step of irradiating the liner constituting members with laser to join the liner constituting members brought into contact with each other as joining targets to each other by laser welding.

Preferably, the preliminary heating step is performed by preliminarily heating at least one of the joining portion of one of the liner constituting members to be joined to each other and the joining portion of the other liner constituting member, and the laser irradiation step is performed by joining, to each other, the joining portions brought into contact with each other by laser welding.

Preferably, the method of producing the gas container further comprises, prior to the preliminary heating step, a step of constituting the joining portion of one of the liner constituting members to be joined to each other by a laser transmitting member, and constituting the joining portion of the other liner constituting member by a laser absorbing member, and the laser irradiation step is performed by irradiating the liner constituting members from a side of the joining portion including the laser transmitting member.

According to this constitution, when the liner constituting members are irradiated with the laser from the side of the laser transmitting joining portion, the laser absorbing joining portion is heated and melted. Moreover, the laser transmitting joining portion is heated and melted owing to heat conduction from the laser absorbing joining portion. When a laser transmitting or absorbing property is imparted to the joining portion, the joining portion can appropriately be joined to each other. It is to be noted that this type of characteristic with respect to the laser may be imparted to the only joining portion, but when the characteristic is imparted to the whole liner constituting member including the joining portion, the liner constituting member can easily be manufactured.

Another gas container of the present invention is a gas container having a resin liner constituted by joining a plurality of liner constituting members, the liner constituting members each having at least a hollow cylindrical part, and a reinforcement layer disposed on an outer periphery of the resin liner, wherein a join part joined to a joining portion of one liner constituting member and a joining portion of another liner constituting member has a laser welding part constituted by joining these joining portions to each other by laser welding, and a heat generating material disposed integrally with the laser welding part or near the laser welding part.

According to this constitution, since the joining portion of the one liner constituting member is joined to the joining portion of the other liner constituting member by the laser welding, the resin liner can be constituted in a short time with low cost. Therefore, productivity of the gas container can be improved. Since the joining portions can locally be heated at a low temperature by use of the laser welding, a thermally influenced portion of each liner constituting member can be minimized, and melting burrs and the like are not generated. Furthermore, since the melting of the joining portions can be promoted by the heat generating material during the laser welding, a welding defect between the joining portions is suppressed, and the portions can further satisfactorily be joined.

A still another gas container of the present invention is a gas container having a resin liner constituted by joining a plurality of liner constituting members, the liner constituting members each having at least a cylindrical part, and a reinforcement layer disposed on an outer periphery of the resin liner, joining portions of the plurality of liner constituting members being joined to each other by laser welding.

Similarly, another method of producing a gas container of the present invention is a method of producing a gas container having a resin liner constituted by joining a plurality of liner constituting members, the liner constituting members each having at least a cylindrical part, the method comprising: a first step of constituting a joining portion of one of the liner constituting members to be joined to each other by a laser transmitting member and constituting a joining portion of the other liner constituting member by a laser absorbing member; a second step of bringing the joining portions of the liner constituting members to be joined to each other into contact with each other after the first step; and a third step of irradiating the liner constituting members with laser from a side of the joining portion including the laser transmitting member to join, to each other, the joining portions brought into contact with each other by laser welding.

According to these constitutions, in the same manner as described above, since the laser welding is used in a manufacturing process of the resin liner, the resin liner can be constituted in a short time with low cost, and productivity of the gas container can be improved.

Here, "the liner constituting members each having at least a cylindrical part" includes that the whole liner constituting member has a cylindrical, annular, bowl-like or domed shape, a square tubular shape such as a triangular or quadrangular shape or the like. Therefore, a section of a part of the liner constituting member may be have a shape of a triangular or polygonal tube, an elliptic cylinder instead of a circular cylinder, or a tube having a curved surface instead of a circular surface.

According to the above-mentioned gas container of the present invention and the method of producing the gas container, since the laser welding is used in joining the liner constituting members to each other, the liner constituting members can appropriately be joined to each other, and the productivity can be improved.

BRIEF DESCRIPTION OF THE DRAWINGS

FIGS. 17A and 17B show a method of producing a gas container according to a ninth embodiment, FIG. 17A is an enlarged sectional view of a join part before joined, and FIG. 17B is an enlarged sectional view of a join part after joined;

FIG. 18 is a side view showing a method of producing a gas container according to a tenth embodiment;

BEST MODE FOR CARRYING OUT THE INVENTION

Figure 1:
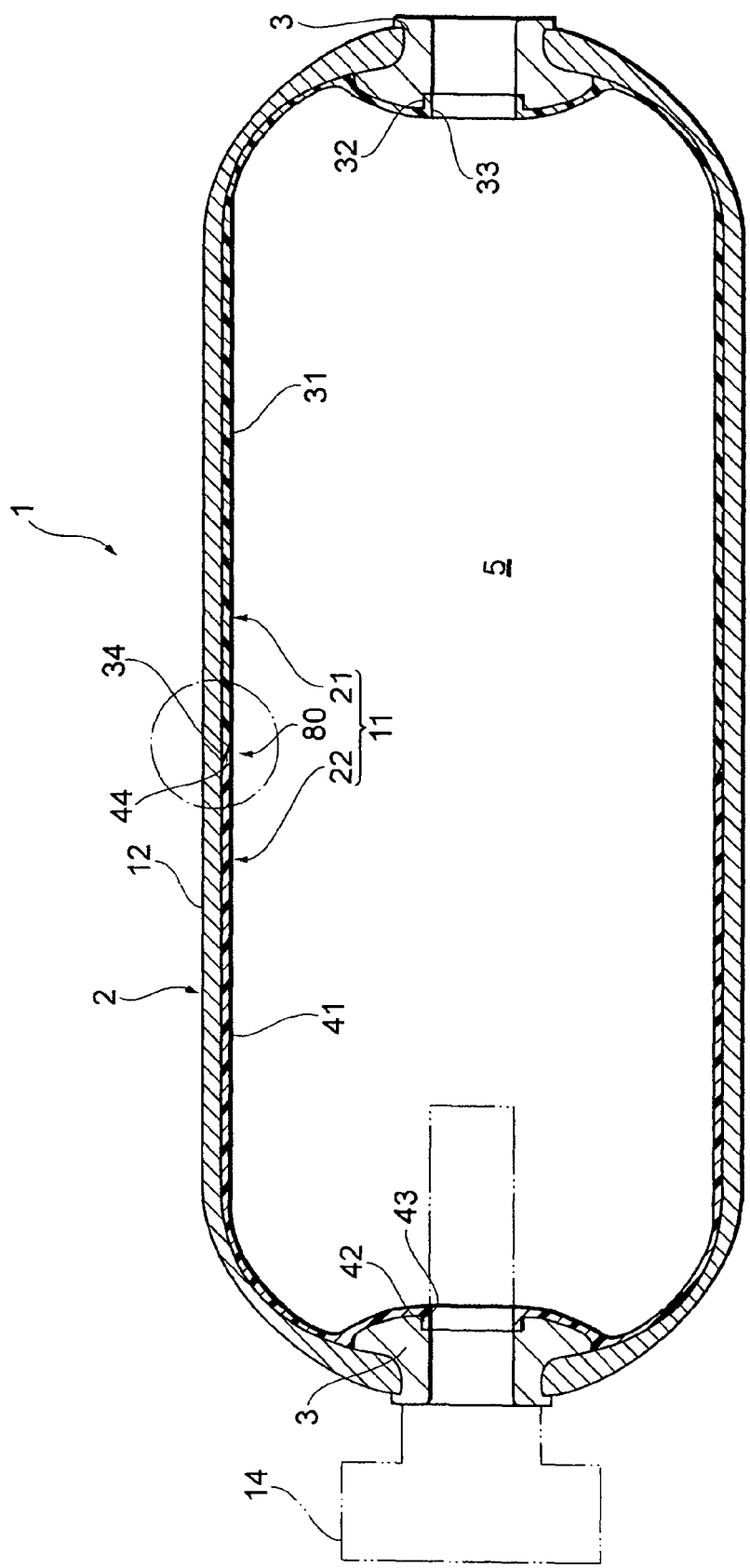
FIG. 1 is a sectional view showing a constitution of a gas container according to a first embodiment.

A gas container and a method of producing the gas container according to preferable embodiments of the present invention will hereinafter be described with reference to the accompanying drawings. This gas container has a resin liner constituted by joining a plurality of liner constituting members by laser welding. In the following, a structure of the gas container will first be described. Subsequently, the method of producing the gas container will be described. In second to twelfth embodiments, modifications of the producing method will mainly be described. In the second and subsequent embodiments, a part common to a first embodiment is denoted with the same reference numerals as those of the first embodiment, and description thereof is appropriately omitted.

First Embodiment

As shown in FIG. 1, a gas container 1 includes a container main body 2 having a sealed cylindrical shape as a whole, and mouthpieces 3, 3 attached to opposite end portions of the container main body 2 in a longitudinal direction. The inside of the container main body 2 is a storage space 5 in which various gases are stored. The gas container 1 may be filled with a normal-pressure gas, or a gas having a pressure increased as compared with a normal pressure. That is, the gas container 1 of the present invention can function as a high-pressure gas container.

For example, in a fuel cell system, the pressure of a combustible fuel gas prepared at a high pressure is reduced for use in power generation of a fuel cell. The gas container 1 of the present invention can be applied to storage of the high-pressure combustible fuel gas, and hydrogen as the fuel gas, a compressed natural gas (the CNG gas) as a raw fuel or the like can be stored. Hydrogen with which the gas container 1 is filled has a pressure of, for example, 35 MPa or 70 MPa, and the CNG gas has a pressure of, for example, 20 MPa. One example of the high-pressure hydrogen gas container will hereinafter be described.

The container main body 2 has a double layer structure of an inner resin liner 11 (an inner shell) having a gas barrier property, and a reinforcement layer 12 (an outer shell) arranged on an outer periphery of the resin liner 11. The reinforcement layer 12 is made of FRP including, for example, carbon fiber and an epoxy resin, and this layer is wound around the resin liner 11 so as to cover an outer surface of the liner.

The mouthpieces 3 are made of a metal such as stainless steep, and are disposed at the center of a semispherical end wall portion of the container main body 2. An inner peripheral surface of an opening of each mouthpiece 3 is provided with an internal thread, and functional components such as a pipe and a valve assembly 14 (a valve body) can be screwed into and connected to the mouthpiece 3 via this internal thread. It is to be noted that, in FIG. 1, an example in which only one of the mouthpieces 3, 3 is provided with the valve assembly 14 is shown by a two-dot chain line.

For example, in the gas container 1 of the fuel cell system, the storage space 5 is connected to an external gas channel (not shown) via the valve assembly 14 in which pipe elements such as a valve and a joint are integrally incorporated, and the storage space 5 is filled with hydrogen. Moreover, hydrogen is discharged from the storage space 5. As described later, in a producing process of the gas container 1, the mouthpiece 3 is connected to a pipe, and the pressure in the storage space 5 is regulated. It is to be noted that the opposite end portions of the gas container 1 are provided with the mouthpieces 3, 3. However, needless to say, only one end portion may be provided with the mouthpiece 3.

The resin liner 11 is constituted by joining, by laser welding, a pair of liner constituting members 21, 22 (divided members) divided into two members at the center in a longitudinal direction and substantially having the same shape. That is, the liner constituting members 21, 22 as the half divided hollow members are joined to each other by the laser welding to constitute the resin liner 11 having a hollow inner part.

The pair of liner constituting members 21, 22 each has trunk portions 31, 41 extending along a predetermined length in an axial direction. Opposite end sides of the trunk portions 31, 41 in the axial direction open.

One liner constituting member 21 (a first liner constituting member) has a return portion 32 formed at an end portion having a reduced diameter on one end side of the trunk portion 31, a communicating portion 33 opened at the center of the return portion 32, and a joining portion 34 formed at a substantially cylindrical end portion on the other end side of the trunk portion 31.

The other liner constituting member 22 (a second liner constituting member) has a return portion 42 formed at an end portion having a reduced diameter on one end side of the trunk portion 41, a communicating portion 43 opened at the center of the return portion 42, and a joining portion 44 formed at a substantially cylindrical end portion on the other end side of the trunk portion 41.

The return portions 32, 42 function so as to secure strengths of the liner constituting members 21, 22. The mouthpieces 3, 3 are positioned between the outer peripheral surfaces of the return portions 32, 42 and the end portion of the reinforcement layer 12. It is to be noted that when the mouthpiece 3 is disposed at only one end portion, one of the pair of liner constituting members 21, 22 is not provided with one of the return portions 32, 42 and the communicating portions 33, 43, and one end side of one of the trunk portions 31, 41 is formed of a closing end.

Here, in the present description, the liner constituting members 21, 22 are members constituting the resin liner 11 having a divided structure, the liner constituting members each having at least a hollow cylindrical end side (a part) as described above. Therefore, the whole shape of the liner constituting members 21, 22 includes a cylindrical, annular, bowl-like or domed shape or the like.

However, according to another aspect of the present invention, the shape of a part of the liner constituting members 21, 22 may be a tubular shape other than the cylindrical shape. For example, a sectional shape of a part of the liner constituting members 21, 22 may be a triangular or polygonal tubular shape, an elliptic tubular shape or a tubular shape including a curved surface other than a circular shape.

Figure 2:
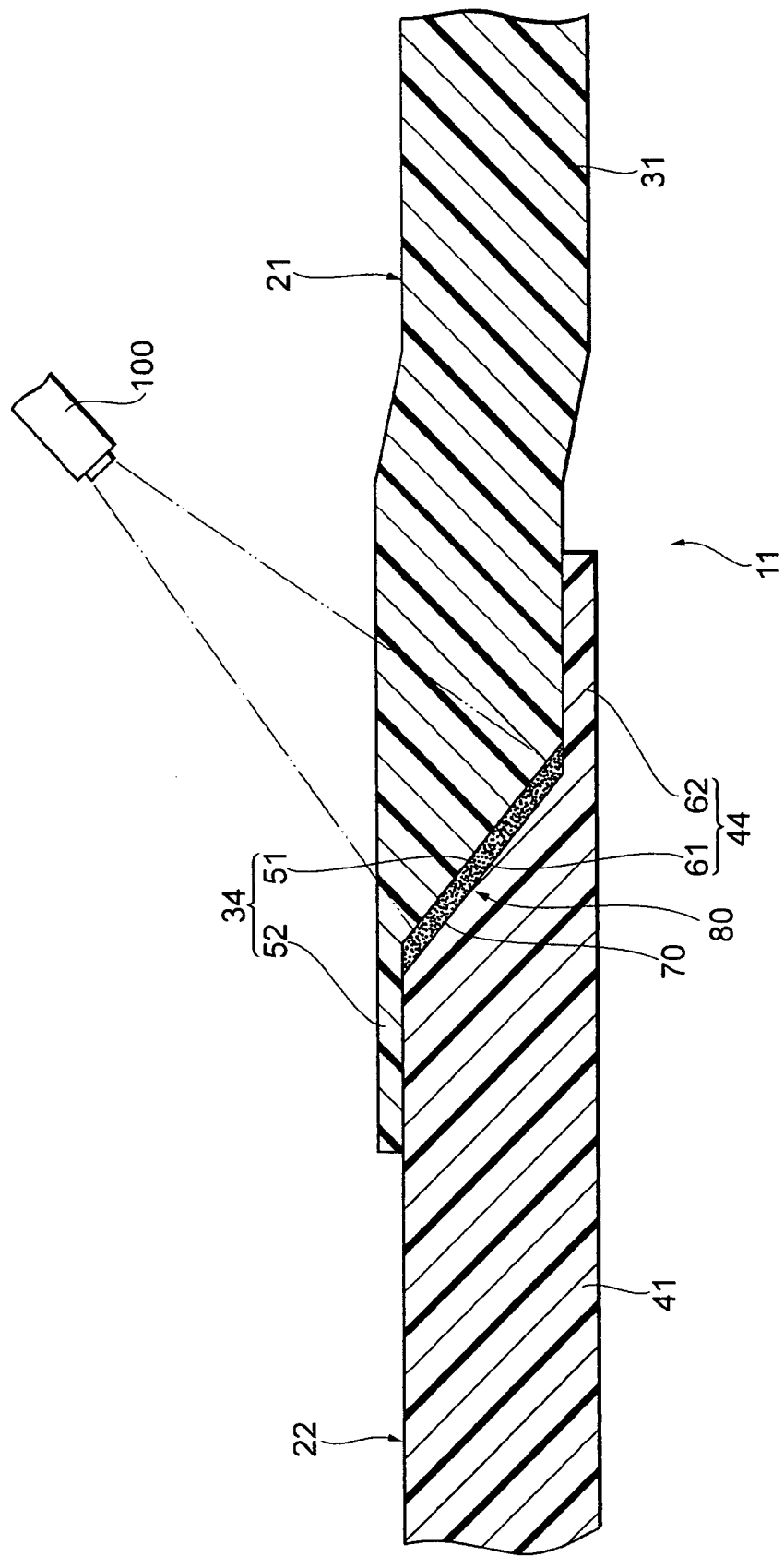
FIG. 2 is an enlarged sectional view of a join part of the gas container according to the first embodiment.

FIG. 2 is an enlarged sectional view around the joining portions 34, 44. It is to be noted that in FIG. 2, the reinforcement layer 12 is omitted.

One joining portion 34 (a first joining portion) has a joining end surface 51 tilted at a predetermined angle and an extending portion 52 extending in an axial direction of the resin liner 11. The joining end surface 51 is formed so as to be inward chamfered (inverted tapered). The extending portion 52 is connected to a tip end portion outside the joining end surface 51 in a diametrical direction, and formed to be substantially cylindrical.

Similarly, the other joining portion 44 (a second joining portion) has a joining end surface 61 tilted at a predetermined angle and an extending portion 62 extending in the axial direction of the resin liner 11. The joining end surface 61 is formed so as to be externally chamfered (tapered). The extending portion 62 is connected to a tip end portion inward from the joining end surface 61 in the diametrical direction, and formed to be substantially cylindrical.

In the joining portions 34 and 44, in a state in which the liner constituting members 21, 22 are butted with each other, the joining end surfaces 51, 61 of both the portions are matched with each other, and the joining end surfaces 51, 61 come in contact with each other over a circumferential direction of the resin liner 11. In this state, the joining portions 34, 44 are arranged to overlap each other in the axial direction of the resin liner 11, and overlapped portions come in contact with each other over the circumferential direction of the resin liner 11.

Here, a pair of overlapped portions are the outer extending portion 52 and the outer peripheral surface near the joining portion 44 which comes in contact with the inner peripheral surface of the extending portion. Another pair of overlapped portions are the inner extending portion 62 and the inner peripheral surface near the joining portion 34 which comes in contact with the outer peripheral surface of this extending portion. Since such extending portions 52, 62 are disposed, in the producing process of the gas container 1 described later, a close contact force between the joining portions 34 and 44 can be improved. It is to be noted that angles of both of the joining end surfaces 51, 61 are arbitrary, but may be such that laser from a laser torch 100 (a laser irradiation device) can be transmitted or received.

In the present embodiment, the liner constituting member 21 having the joining portion 34 positioned on the external side of the resin liner 11 is made of a laser transmitting thermoplastic resin. On the other hand, the liner constituting member 22 having the joining portion 44 positioned on the internal side of the resin liner 11 is made of a laser absorbing thermoplastic resin.

The laser transmitting thermoplastic resin may have transmittance with respect to the laser to such an extent that energy necessary for laser welding reaches the joining end surface 61 of the joining portion 44 on a laser absorbing side. Therefore, even the laser transmitting thermoplastic resin may have a slight laser absorbing property. Examples of the laser transmitting thermoplastic resin include polyethylene, polypropylene and nylon 66, but a reinforcing fiber such as a glass fiber and a coloring agent may be added to these resins. For example, the laser transmitting liner constituting member 21 is formed to be white, translucent or transparent.

The laser absorbing thermoplastic resin may have a laser absorbing property, as long as the resin generates heat and is melted owing to the absorbed laser. Examples of the laser absorbing thermoplastic resin include polyethylene, polypropylene and nylon 66, but a reinforcing fiber such as a glass fiber and a coloring agent may be added to these resins. For example, when the laser absorbing thermoplastic resin is made of the same resin as that of the laser transmitting thermoplastic resin, the resin is formed by adding more carbons thereto than to the laser transmitting thermoplastic resin. Therefore, the laser absorbing liner constituting member 22 is formed in, for example, black.

The laser transmitting joining portion 34 and the laser absorbing joining portion 44 have the joining end surfaces 51, 61 joined to each other by the laser welding. The laser welding is performed by externally irradiating the joining portion 34 with the laser by the laser torch 100 to heat and melt the resin of the joining end surface 61, and heating and melting the resin of the joining end surface 51 owing to heat conduction from this joining end surface 61.

Therefore, a laser welding part 70 disposed at a join part 80 joined to the joining portions 34, 44 is a part where both of the joining end surfaces 61 and 51 are melted, and has a state in which both of the laser absorbing and transmitting resins are entangled.

It is to be noted that the whole liner constituting members 21, 22 do not have to be made of laser transmitting and absorbing resins. For example, the only joining portions 34, 44 are made of the laser transmitting and absorbing resins. Thus, the liner constituting members 21, 22 may partially have laser transmitting and absorbing properties.

Moreover, for example, both of the pair of liner constituting members 21, 22 are made of the laser transmitting resin beforehand. The joining end surface 51 (or 61) of the joining portion 34 (or 44) of the one liner constituting member 21 (or 22) may be coated with an absorbent having a laser absorbing property, or a sheet in which this type of adsorbent is kneaded may be attached to the joining end surface.

Figure 3:
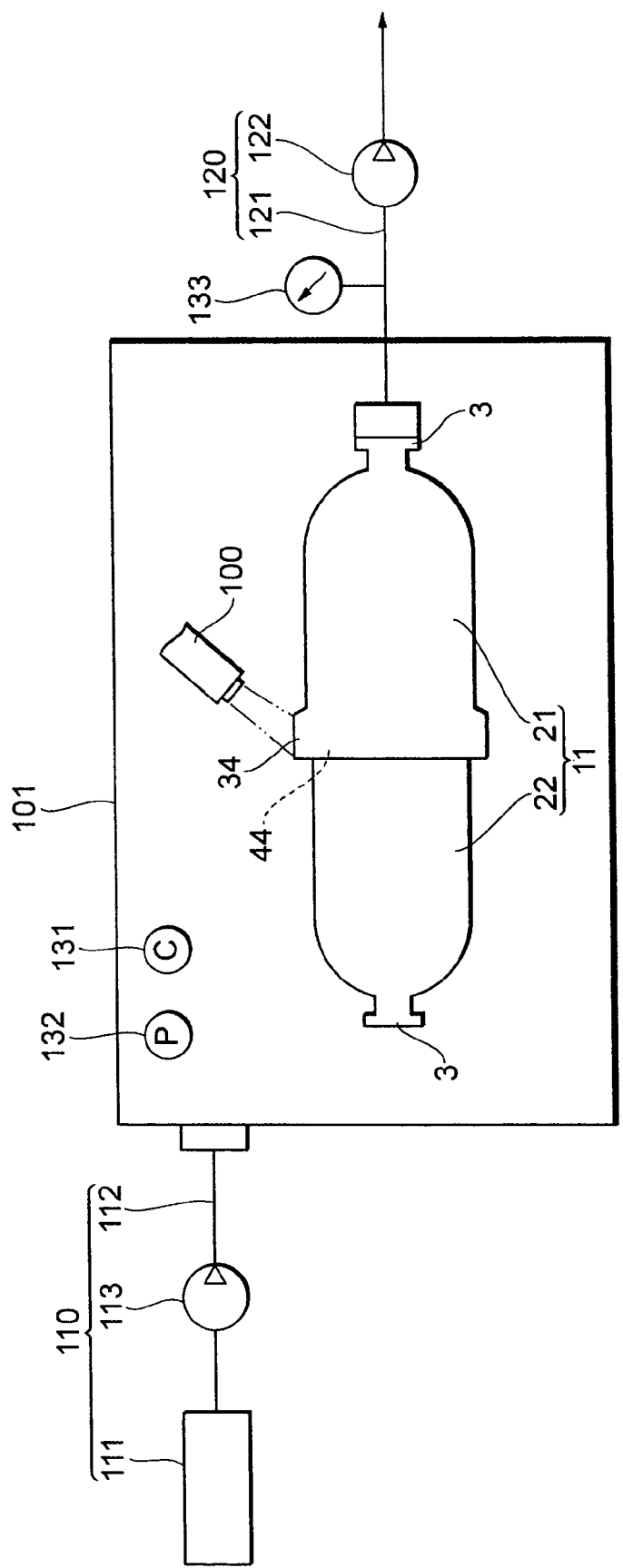
FIG. 3 is a block diagram showing a method of producing the gas container according to the first embodiment.
Figure 4:
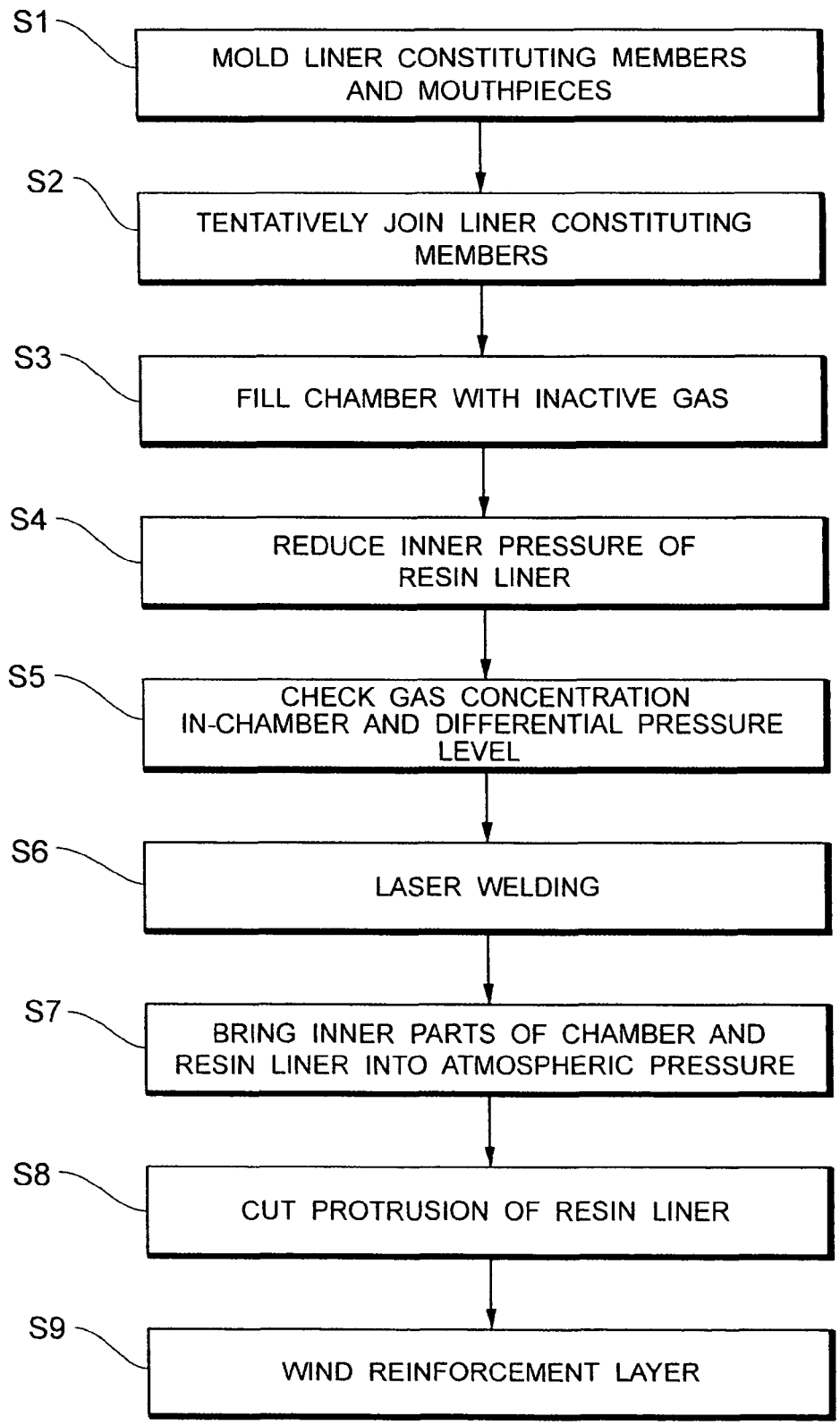
FIG. 4 is a flow chart showing steps of the method of producing the gas container according to the first embodiment.

Here, a method of producing the gas container 1 will be described with reference to FIGS. 3 and 4.

First, a pair of liner constituting members 21, 22 and two mouthpieces 3, 3 are molded (step S1). At this time, for example, one mouthpiece 3 molded beforehand is arranged in a mold, and a laser transmitting thermoplastic resin is injected into this mold to integrally mold the liner constituting member 21 and the mouthpiece 3 (insertion mold).

Moreover, by a similar procedure, a laser absorbing thermoplastic resin is injected to integrally mold the liner constituting member 22 and the mouthpiece 3. When the injection molding is used in this manner, the liner constituting members 21, 22 can be molded with good molding precision. It is to be noted that instead of the injection molding, rotary molding and blow molding may be used.

Subsequently, the liner constituting members 21, 22 provided with the mouthpieces 3 are arranged with, for example, a laterally directed posture in a chamber 101, and the liner constituting members 21, 22 are butted with each other to bring the joining portions 34, 44 into contact with each other (step S2). In this state, as described above, the joining portions 34, 44 are arranged so as to overlap each other in the axial direction. Moreover, the joining end surfaces 51, 61 come in contact with each other over a circumferential direction. In consequence, the resin liner 11 having a state in which the liner constituting members 21, 22 are tentatively joined (temporarily joined) to each other is obtained.

Subsequently, a plug (not shown) is screwed into and connected to the mouthpiece 3 of the liner constituting member 22, and a pipe 121 is screwed into and connected to the mouthpiece 3 of the liner constituting member 21 to bring an inner state of the tentatively joined resin liner 11 into a substantially sealed state. It is to be noted that the mouthpiece 3 into which the plug and the pipe 121 are to be screwed may be reversed.

Subsequently, an inactive gas supply device 110 connected to the chamber 101 is driven to fill the chamber 101 with an inactive gas (step S3). The inactive gas supply device 110 includes, for example, a gas container 111 in which the inactive gas is stored, a gas pipe 112 which connects the gas container 111 to the chamber 101, and a pump 113 for the chamber which is disposed at the gas pipe 112 and which feeds the inactive gas of the gas container 111 into the chamber 101 under pressure.

Examples of the inactive gas include argon, nitrogen and helium. Since the chamber 101 is filled with the inactive gas by the inactive gas supply device 110, the chamber around the resin liner 11 is set to an inactive gas atmosphere. Under such an inactive gas atmosphere, oxidation of the joining portions 34, 44 can be suppressed during the laser welding of the subsequent step.

In the next step, a negative pressure generation device 120 connected to the tentatively joined resin liner 11 is driven to reduce the pressure of the substantially closed space of the resin liner 11 (step S4). The negative pressure generation device 120 includes, for example, the pipe 121 connected to the mouthpiece 3 described above, and a pump 122 for the liner which is disposed at the pipe 121 outside the chamber 101 and which reduces the pressure in the resin liner 11.

When the pump 122 for the liner is driven, the inside of the resin liner 11 has a negative pressure. When the pressure in the resin liner 11 is lower than that of the chamber 101, a pressure difference is generated in the inside and the outside of the resin liner 11. A close contact degree between the joining portions 34 and 44 improves owing to this pressure difference. Especially, since the joining portions 34, 44 overlap with each other in the axial direction, and the overlapped portions come in contact with each other, a close contact force between the joining portions 34 and 44 further improves.

Here, it is checked, based on a concentration sensor 131 disposed in the chamber 101, whether or not the inside of the chamber 101 reaches a predetermined concentration of the inactive gas prior to the laser welding (step S5). When the predetermined concentration is reached, driving of the inactive gas supply device 110 may be stopped. Based on a detection result obtained by a pressure sensor 132 disposed in the chamber 101 and a detection result obtained by a pressure sensor 133 disposed at the pipe 121, it is checked whether or not a differential pressure level between the inside and the outside of the resin liner 11 reaches a predetermined value (step S5).

When the differential pressure level reaches the predetermined value, the driving of the negative pressure generation device 120 may be stopped to close a cut-off valve (not shown) disposed at the pipe 121. Needless to say, even during the laser welding of the subsequent step, the driving of the negative pressure generation device 120 may be continued (controlled) to maintain the differential pressure between the inside and the outside of the resin liner 11 at a predetermined level during the laser welding. It is to be noted that arrangement positions of the two pressure sensors 132, 133 are not limited to the above-mentioned positions.

In the next step, the laser torch 100 is driven to join the joining portions 34, 44 of the resin liner 11 to each other by the laser welding (step S6). The laser torch 100 irradiates the joining end surfaces 51, 61 brought into contact with each other with laser externally from the laser transmitting joining portion 34. The emitted laser passes through the laser transmitting joining portion 34 to reach the laser absorbing joining end surface 61, and heats and melts the resin of this joining end surface 61. The resin of the laser transmitting joining end surface 51 is heated and melted owing to the heat conduction from this joining end surface 61. Moreover, when these melted resins are cooled to solidify, the laser welding part 70 is formed to integrally join the joining portions 34, 44 to each other.

Here, during the laser welding (step S6), a rotation device (not shown) is driven in synchronization with the irradiation with the laser by the laser torch 100 to rotate the tentatively joined resin liner 11 around an axis of the liner. In consequence, the laser absorbing joining end surface 61 is successively heated and melted in a circumferential direction. Moreover, owing to this heat conduction, the laser absorbing joining end surface 61 is successively heated and melted in the circumferential direction. Therefore, while the substantially cylindrical shape of the resin liner 11 is maintained, the resin liner 11 is rotated at least once. In consequence, the laser welding part 70 is formed to integrally join the joining end surfaces 51, 61 to each other over the circumferential direction of the surfaces.

It is to be noted that instead of directly rotating the resin liner 11, the laser torch 100 may directly be rotated around the resin liner 11. Instead, both of the resin liner 11 and the laser torch 100 may be rotated in the same direction or a reverse direction. Needless to say, when the resin liner 11 is rotated as described above, positioning and device constitutions of the resin liner 11 can be simplified.

In the above-mentioned laser welding, since the shapes of the two joining portions 34, 44 are devised, an area of the portion for the laser welding can be enlarged. Specifically, when the joining end surfaces 51, 61 are tilted in the axial direction of the resin liner 11 as shown in FIG. 2, a contact area between the joining end surfaces 51 and 61 can be enlarged as compared with a case where the joining end surfaces 51, 61 are allowed to cross the axial direction of the resin liner 11 at right angles. In consequence, the laser welding part 70 can be formed into a sufficient size, and joining strength or the like of the resin liner 11 can preferably be improved.

Moreover, the laser welding is performed in a state in which the differential pressure is generated between the inside and the outside of the resin liner 11. Therefore, the joining end surfaces 51, 61 are joined to each other in a state in which the close contact degree between the joining portions 34 and 44 increases. In consequence, since the joining end surfaces 51, 61 are satisfactorily joined to each other by the laser welding, the strength and air-tightness of the resin liner 11 can appropriately be secured.

Furthermore, a pressurizing jig or the like to bring the joining portions 34, 44 into close contact with each other can be simplified or obviated. Furthermore, the close contact force generated by the differential pressure can effectively be applied between the joining portions 34 and 44 owing to a joint structure between the overlapped joining portions 34 and 44, and a reaction of the laser welding can satisfactorily proceed.

In addition, since the step of the laser welding is performed under the inactive gas atmosphere, the oxidation of the joining portions 34 and 44 is suppressed. In consequence, burn-and-stick due to the local oxidation between the joining portions 34 and 44, a transmission defect of the laser and pinholes generated by the burn-and-stick and the like can be avoided, and the joining end surfaces 51, 61 can satisfactorily and appropriately be joined to each other. When the laser welding is completed, the tentatively joined resin liner 11 are finally joined (i.e., completely joined) to constitute the storage space 5 in the hollow inner part.

It is to be noted that as the laser to be emitted by the laser torch 100, semiconductor laser or the like may be used, but the present invention is not limited to this embodiment, and the laser is appropriately selected in consideration of properties including a thickness of the resin of the laser transmitting liner constituting member 21. In the laser welding step, various conditions such as an output (an irradiation amount) of the laser and a rotation speed of the resin liner 11 may appropriately be set in accordance with the properties of the liner constituting members 21, 22.

After the completion of the laser welding, inner parts of the chamber 101 and the resin liner 11 are returned to the atmospheric pressure (step S7). Subsequently, a protrusion of a joint portion at the outer peripheral surface of the resin liner 11 is cut (step S8). This protrusion includes a peripheral portion including the extending portion 52 of the laser transmitting joining portion 34, and is formed over the circumferential direction of the resin liner 11 so as to protrude externally from the resin liner 11 (see FIG. 2).

In the cutting step of the step S8, when this protrusion is cut over the circumferential direction, the joint portion at the outer peripheral surface of the resin liner 11 is disposed at the same plane (with a substantially equal outer diameter). Moreover, finally, the reinforcement layer 12 is formed on the outer surface of the resin liner 11 by a filament winding process or the like (step S9), thereby producing the gas container 1.

As described above, according to the present embodiment, since the laser welding is used in joining the liner constituting members 21 and 22 to each other, the resin liner 11 can be manufactured in a short time with low cost. In consequence, productivity of the gas container 1 can be improved as a whole. As described above, since the laser welding is performed under the inactive gas atmosphere and the differential pressure is applied to improve the close contact degree between the joining portions 34 and 44, the joining defect can be suppressed, and the resin liner 11 can be manufactured with high joining precision.

It is to be noted that the protrusion of the joint portion at the outer peripheral surface of the resin liner 11 is formed by both of the liner constituting members 21, 22, depending on the shapes of the joining portions 34, 44 in some case. In this case, in the cutting step of the step S8, both of the outer peripheral surfaces of the two liner constituting members 21, 22 may be shaved.

Second Embodiment

Figure 5:
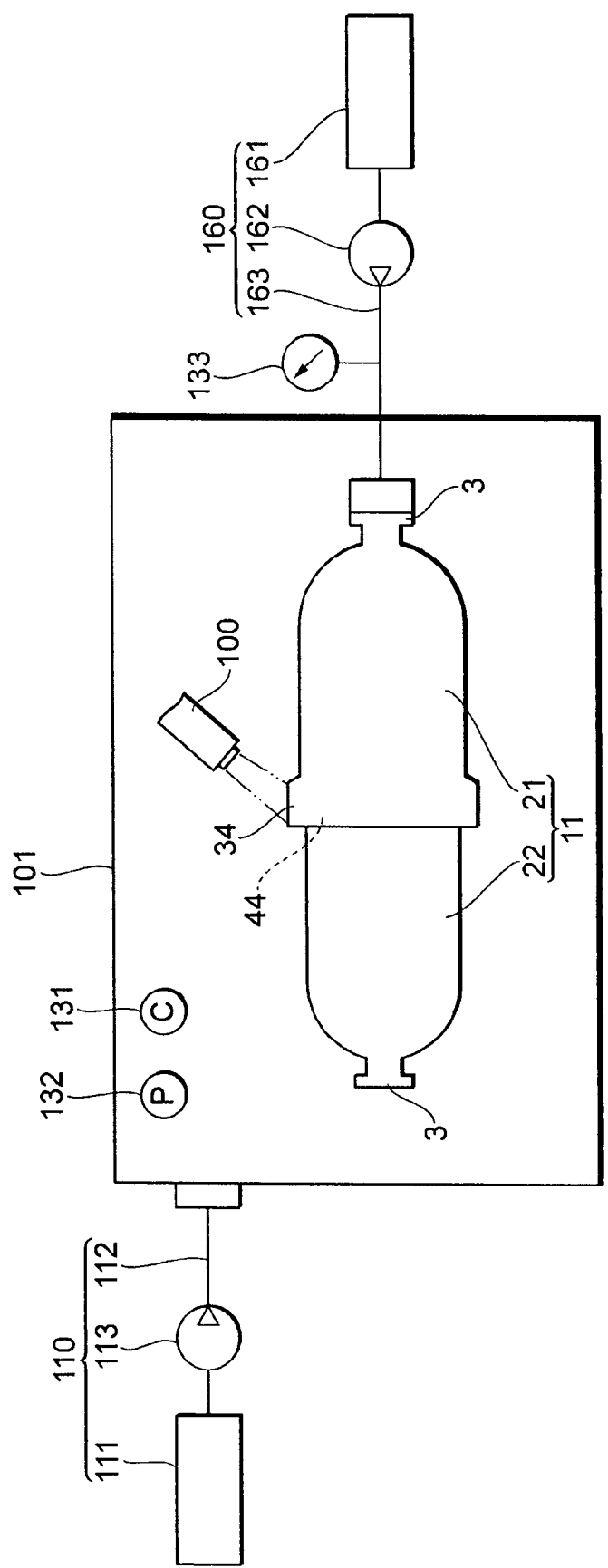
FIG. 5 is a block diagram showing a method of producing a gas container according to a second embodiment.
Figure 6:
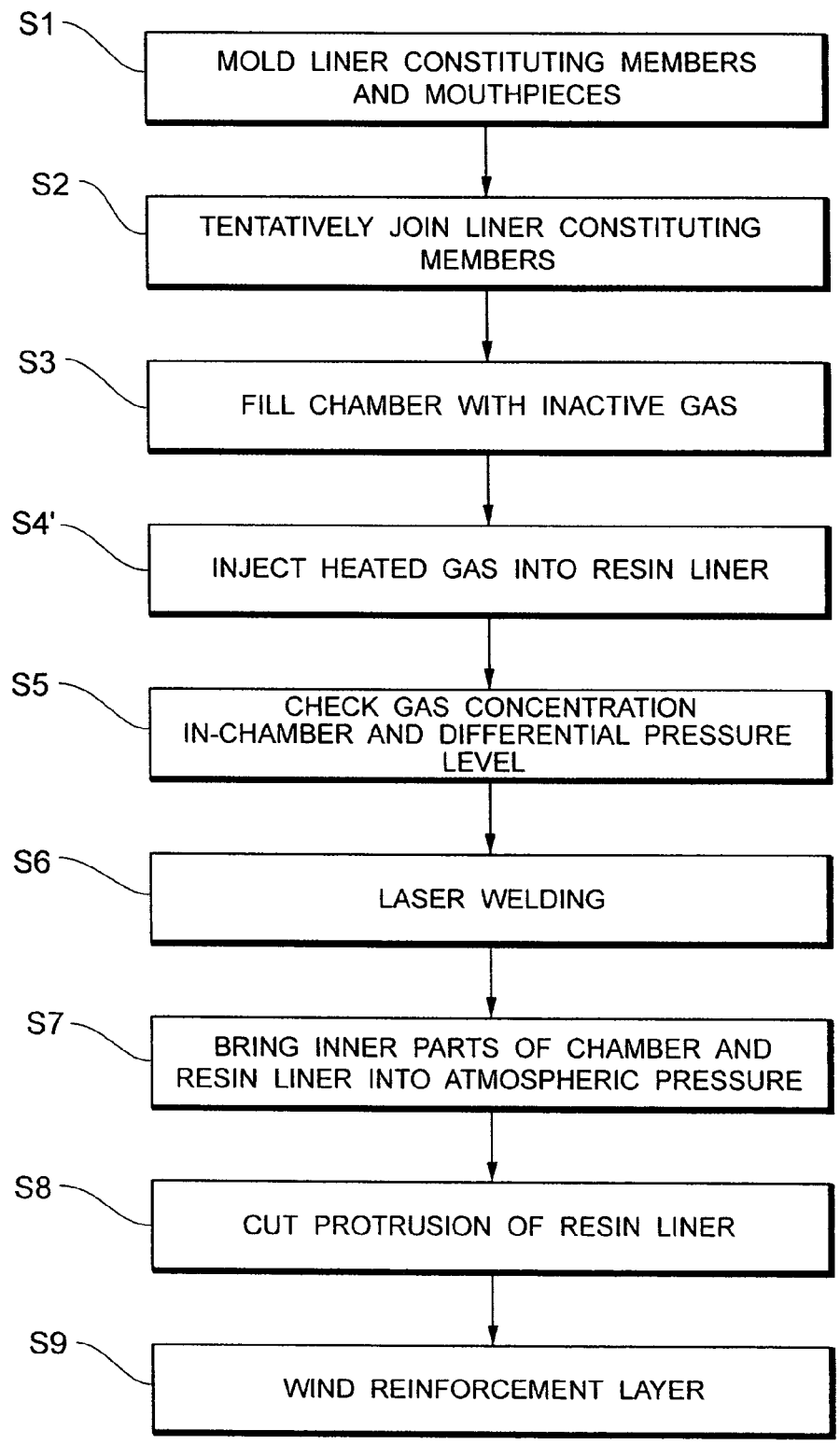
FIG. 6 is a flow chart showing steps of the method of producing the gas container according to the second embodiment.

Next, different respects of a method of producing a gas container 1 according to a second embodiment will mainly be described with reference to FIGS. 5 and 6. The embodiment is different from the first embodiment in that a heated gas supply device 160 is disposed as a differential pressure generation device which replaces the negative pressure generation device 120 and that the step S4 of producing steps is accordingly changed to step S4'.

The heated gas supply device 160 can be constituted in the same manner as in the inactive gas supply device 110. For example, the heated gas supply device 160 includes a gas container 161 in which the inactive gas is stored, a pipe 162 which connects the gas container 161 to a mouthpiece 3 of a tentatively joined resin liner 11, and a pump 163 for the liner which is disposed at the pipe 162 outside a chamber 101 and which feeds an inactive gas of the gas container 161 into the resin liner 11 under pressure.

The inactive gas to be supplied into the resin liner 11 may be of a type different from that of the inactive gas to be supplied into the chamber 101, but the same type of gas may be used. When the same type of gas is used, the gas container 161 is omitted, and a gas container 111 for the chamber 101 may be used in common to the heated gas supply device 160.

The pump 163 for the liner contains a heater (not shown) which heats the inactive gas from the gas container 161. Therefore, when the pump 163 for the liner is driven, the heated inactive gas is supplied into the resin liner 11. It is to be noted that, needless to say, the heater does not have to be disposed at the pump 163 for the liner. For example, the pipe 162 may be provided with heating means such as the heater.

In the step S4' of the producing steps, the heated gas supply device 160 connected to the tentatively joined resin liner 11 is driven to supply the heated inactive gas to a substantially sealed space of the resin liner 11. When the resin liner 11 is filled with a predetermined amount of the inactive gas, an inner pressure of the resin liner 11 increases. Moreover, when the inner pressure of the resin liner 11 becomes higher than that of the chamber 101 (i.e., an outer pressure of the resin liner 11), a pressure difference is made between the inside and the outside of the resin liner 11.

Therefore, even according to the present embodiment, the pressure difference can be generated between the inside and the outside of the resin liner 11. In consequence, in a laser welding step (step S6) as a subsequent step, joining portions 34, 44 can be joined to each other by laser welding in a state in which a close contact degree between the joining portions 34 and 44 is improved. It is to be noted that it is preferable to control the driving of the pump 163 for the liner so as to maintain the differential pressure between the inside and the outside of the resin liner 11 at a predetermined level even during the laser welding.

Third Embodiment

Figure 7:
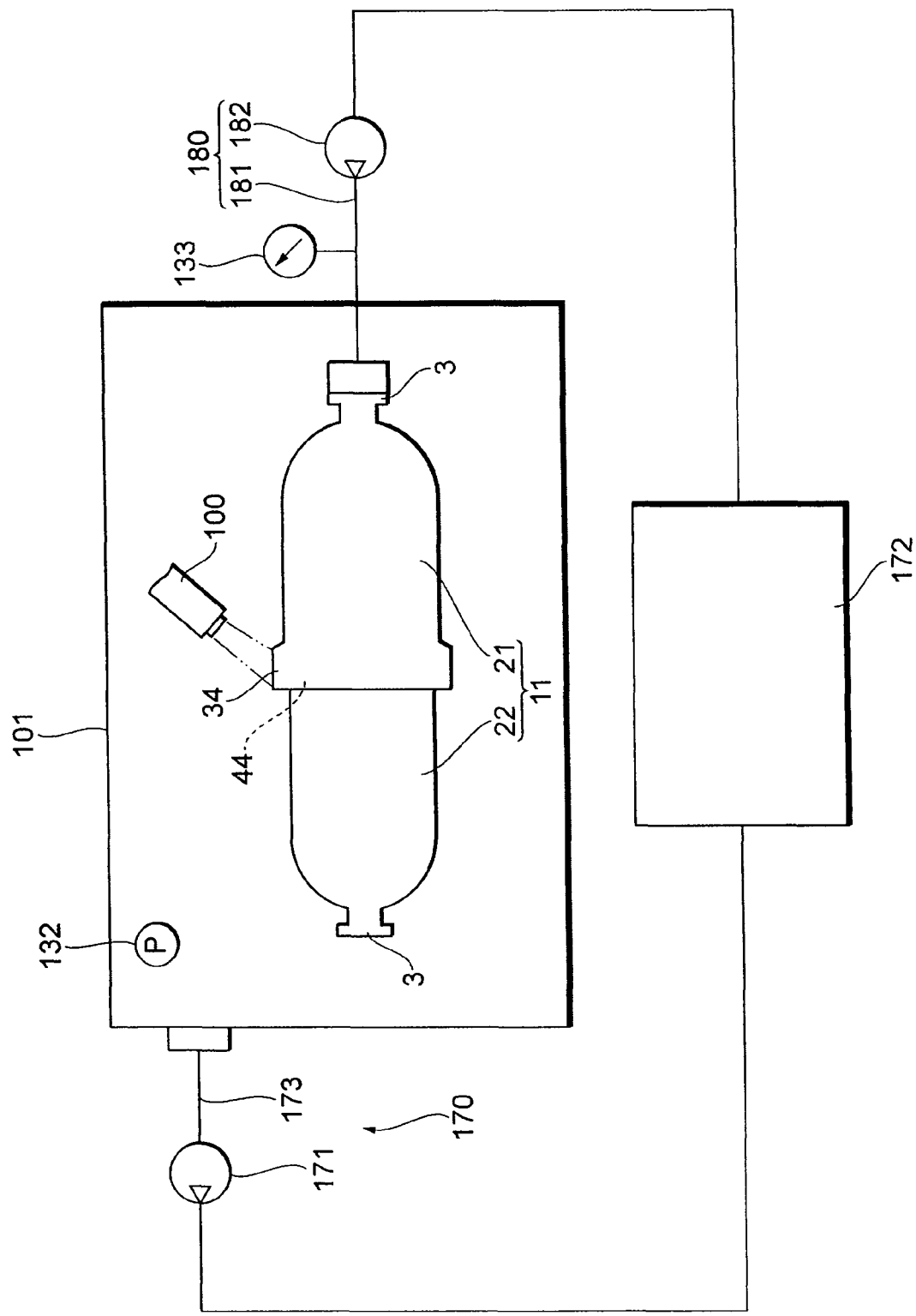
FIG. 7 is a block diagram showing a method of producing a gas container according to a third embodiment.
Figure 8:
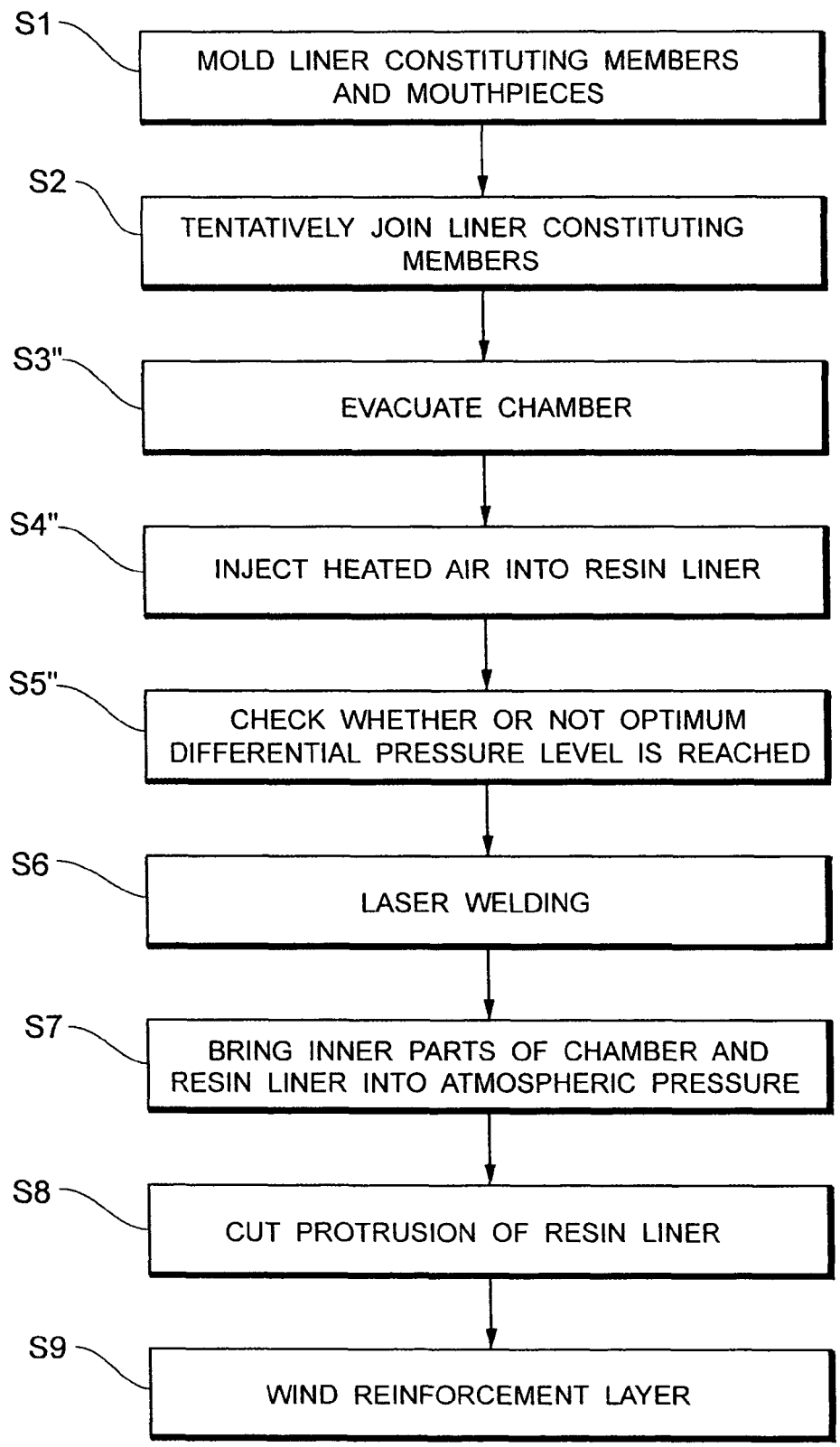
FIG. 8 is a flow chart showing steps of the method of producing the gas container according to the third embodiment.

Next, different respects of a method of producing a gas container 1 according to a third embodiment will mainly be described with reference to FIGS. 7 and 8. The embodiment is different from the first embodiment in that a vacuum generation device 170 is disposed instead of the inactive gas supply device 110 and that a heated air supply device 180 is disposed as a differential pressure generation device which replaces the negative pressure generation device 120 and that the steps S3 to S5 of producing steps are accordingly changed to steps S3" to S5".

The vacuum generation device 170 includes, for example, a vacuum pump 171 which sucks air from a chamber 101, a buffer tank 172 in which the air sucked by the vacuum pump 171 is temporarily stored, and an air pipe 173 which connects the chamber 101 to the buffer tank 172.

When the vacuum pump 171 disposed at the air pipe 173 is driven, the inside of the chamber 101 can be set to a vacuum state. It is to be noted that a sensor to detect a vacuum degree in the chamber 101 is disposed at the air pipe 173 on an upstream side (a chamber 101 side) of the vacuum pump 171, and driving of the vacuum pump 171 may be controlled based on a detection result of the sensor.

The heated air supply device 180 heats air sucked from the chamber 101 by the vacuum generation device 170 to supply the air into a resin liner 11. The heated air supply device 180 includes, for example, a pump 181 for the liner which feeds the air stored in the buffer tank 172 into the resin liner 11 under pressure, and a pipe 182 which connects a mouthpiece 3 of the resin liner 11 to the buffer tank 172 via the pump 181 for the liner.

The pump 181 for the liner contains a heater (not shown) for oil diffusion which heats the air from the buffer tank 172. Therefore, when the pump 181 for the liner is driven, the air heated by the heater is supplied into the resin liner 11.

It is to be noted that instead of a constitution in which the pump 181 for the liner is provided with the heater, for example, the pipe 182 and the buffer tank 172 may be provided with heating means such as the heater. The heated air supply device 180 may be constituted in the same manner as in, for example, the heated gas supply device 160 of the second embodiment or the like. However, when the air evacuated from the chamber 101 is injected into the resin liner 11, the whole efficiency of the system can be increased.

In the step S3" of the producing steps of the present embodiment, the chamber 101 in which the tentatively joined resin liner 11 is installed is evacuated. This is performed by driving the vacuum pump 171 for a predetermined time. In consequence, the inside of the chamber 101 is brought into a vacuum state.

In the next step S4", the pump 181 for the liner is driven to supply the heated air into a substantially sealed space of the resin liner 11. When the resin liner 11 is filled with a predetermined amount of the heated air, an inner pressure of the resin liner 11 increases.

Moreover, when the inner pressure of the resin liner 11 is higher than that of the chamber 101 (i.e., an outer pressure of the resin liner 11), a pressure difference is generated between the inside and the outside of the resin liner 11. It is checked by, for example, a pressure sensor 132 disposed in the chamber 101 and a pressure sensor 133 disposed at the pipe 182 whether or not this pressure difference reaches a predetermined level (an optimum differential pressure level) (step S5"), and the flow shifts to the next laser welding step (step S6).

Therefore, even according to the present embodiment, since the pressure difference can be generated between the inside and the outside of the resin liner 11, in a laser welding step (step S6) as a subsequent step, joining portions 34, 44 can be joined to each other by laser welding in a state in which a close contact degree between the joining portions 34 and 44 is improved. Moreover, since the laser welding can be performed in a vacuum state, oxidation between the joining portions 34 and 44 can appropriately be suppressed, and the joining end surfaces 51, 61 can satisfactorily and appropriately be joined to each other.

Furthermore, the embodiment is useful as compared with the above embodiments in that when the chamber 101 is evacuated, impurities which might stick to an outer surface of the resin liner 11 and the like can be sucked (removed) together with the air. The embodiment is also useful in that after completion of the laser welding (step S6), air-tightness of the resin liner 11 can quickly be confirmed. For example, when the heated air is supplied into the resin liner 11 after the completion of the laser welding and changes of pressures of the inside and the outside of the resin liner 11 are detected by the pressure sensor 132, the air-tightness after the welding can be checked.

It is to be noted that in the above descriptions of the first to third embodiments, the inner pressure of the resin liner 11 is regulated to apply the pressure difference between the inside and the outside of the resin liner 11. Needless to say, instead of this constitution, the outer pressure of the resin liner 11, that is, the pressure in the chamber 101 between an outer wall of the resin liner 11 and an inner wall of the chamber 101 may be regulated to apply the pressure difference between the inside and the outside of the resin liner 11. Both of the inner pressure and the outer pressure of the resin liner 11 may be regulated.

Fourth Embodiment

Figure 9:
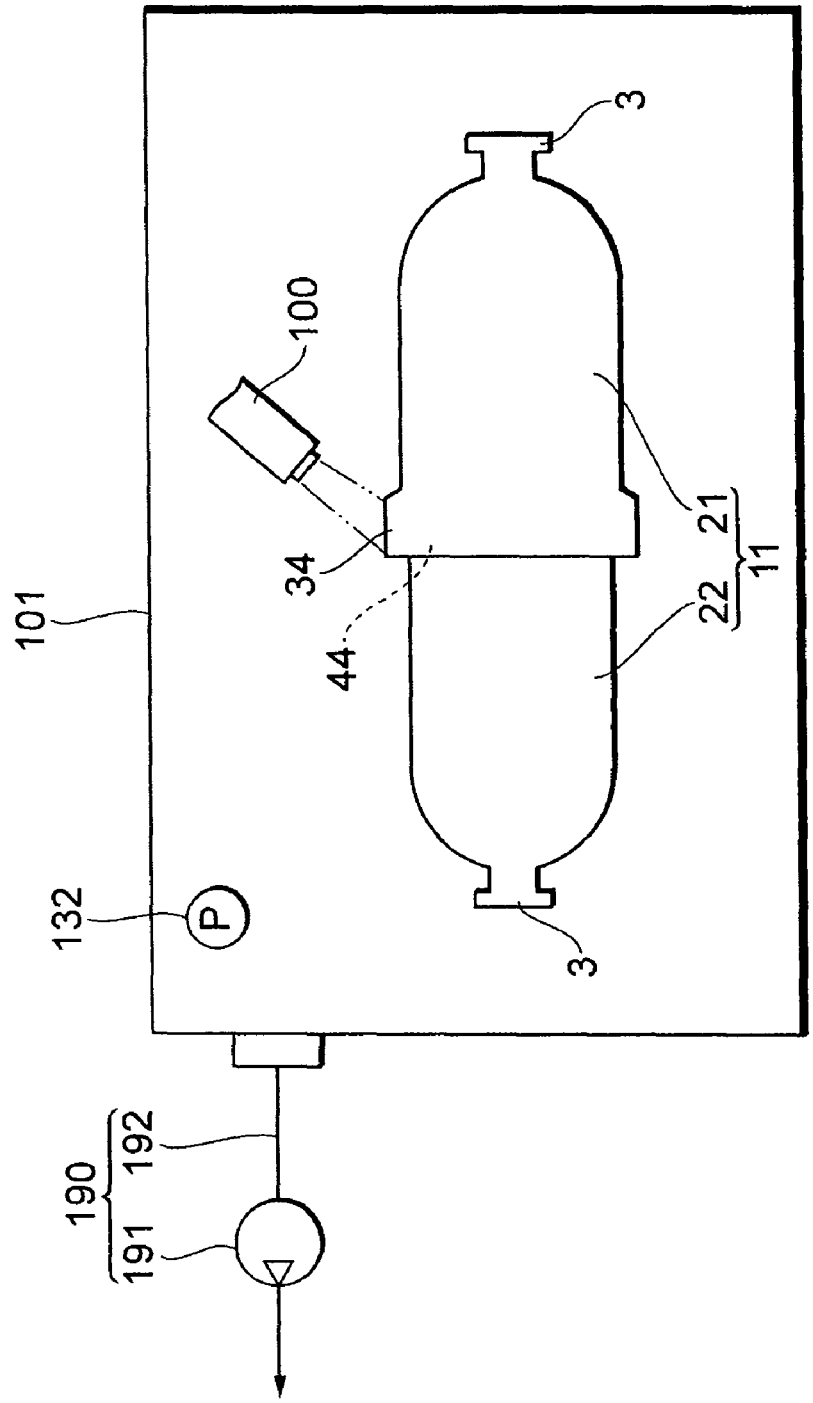
FIG. 9 is a block diagram showing a method of producing a gas container according to a fourth embodiment.
Figure 10:
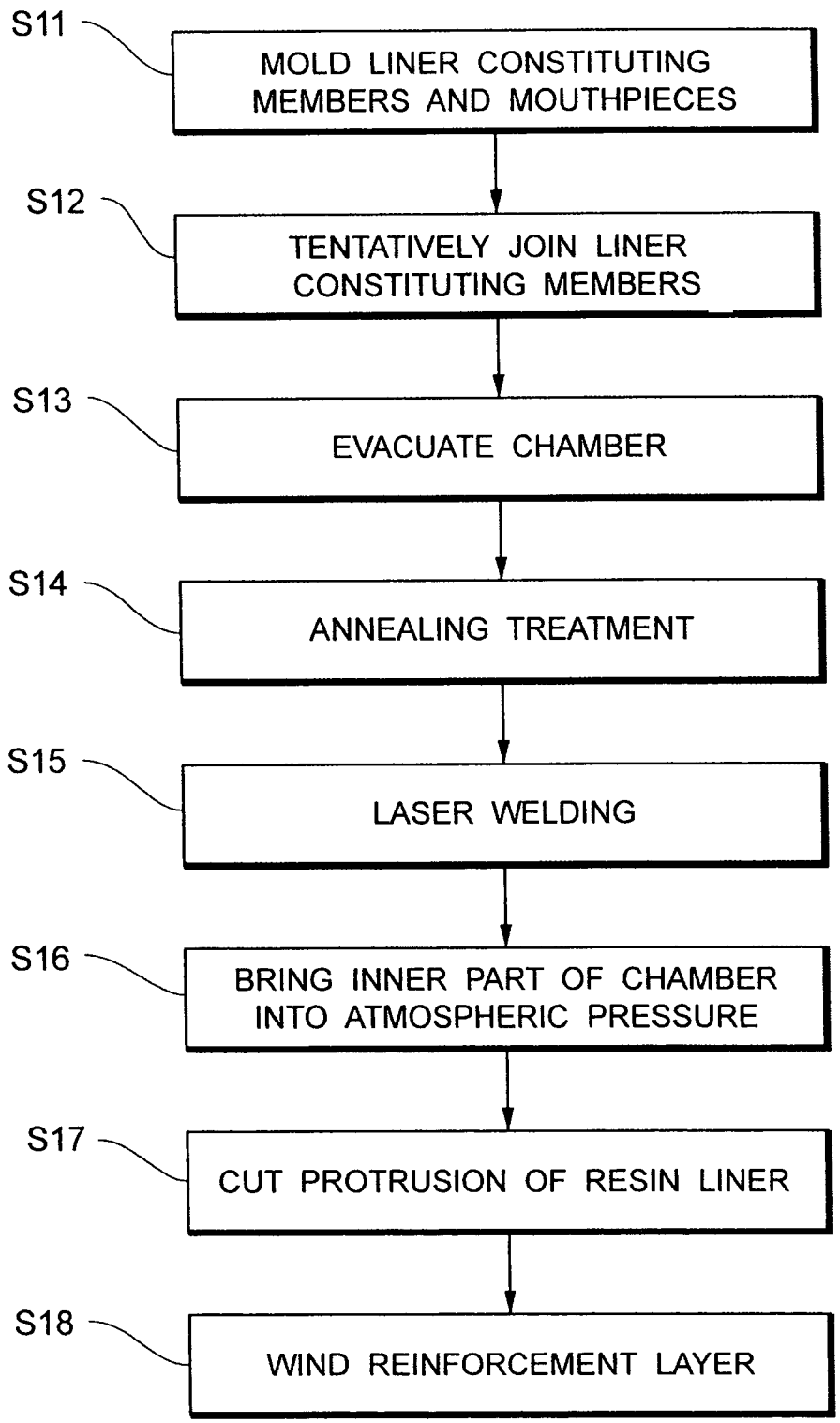
FIG. 10 is a flow chart showing steps of the method of producing the gas container according to the fourth embodiment.

Next, different respects of a method of producing a gas container 1 according to a fourth embodiment will mainly be described with reference to FIGS. 9 and 10. The embodiment is mainly different from the first embodiment in that an annealing treatment (step S14) of a tentatively joined resin liner 11 is performed prior to a laser welding step (step S15). It is to be noted that, since steps S11 and S12 of producing steps are the same as the steps S1 and S2 of the first embodiment and steps S15 to S18 are the same as the steps S6 to S9 of the first embodiment, detailed description of these steps are omitted.

In step S13 of the producing steps, a chamber 101 in which the tentatively joined resin liner 11 is installed is evacuated. This is performed by, for example, driving a vacuum pump 191 of a vacuum generation device 190 to suck air from the chamber 101 via an air pipe 192 connected to the chamber 101. This vacuum generation device 190 can be constituted in the same manner as in the vacuum generation device 170 of the third embodiment.

In the annealing treatment of the next step S14, first the inside of the chamber 101 is heated to heat the resin liner 11 at a predetermined temperature. After this heated state is retained for a predetermined time, the inside of the chamber 101 is cooled to cool the resin liner 11.

In this annealing treatment, a residual stress of the resin liner 11 is removed, but at this time, liner constituting members 21, 22 themselves contract. Therefore, a close contact degree between joining portions 34 and 44 improves. In consequence, in a laser welding step (step S15) after completion of the annealing treatment, the joining portions 34, 44 having the improved close contact degree can be joined to each other by laser welding.

Therefore, even according to the present embodiment, the joining portions 34, 44 can satisfactorily and appropriately be joined to each other by the laser welding. Since the annealing treatment is performed in vacuum, the flow can shift as it is to the laser welding step after the completion of the annealing treatment.

It is to be noted that even in the present embodiment, the above-mentioned differential pressure generation device (the negative pressure generation device 120 of the first embodiment, the heated gas supply device 160 of the second embodiment or the heated air supply device 180 of the third embodiment) may auxiliary be used. In consequence, the close contact degree between the joining portions 34 and 44 can further be improved. Since the close contact degree between the joining portions 34 and 44 is improved by the annealing treatment, constituting elements (e.g., the pumps 122, 163 and 181 for the liners) of the differential pressure generation devices can be miniaturized and simplified.

Fifth Embodiment

Figure 11:
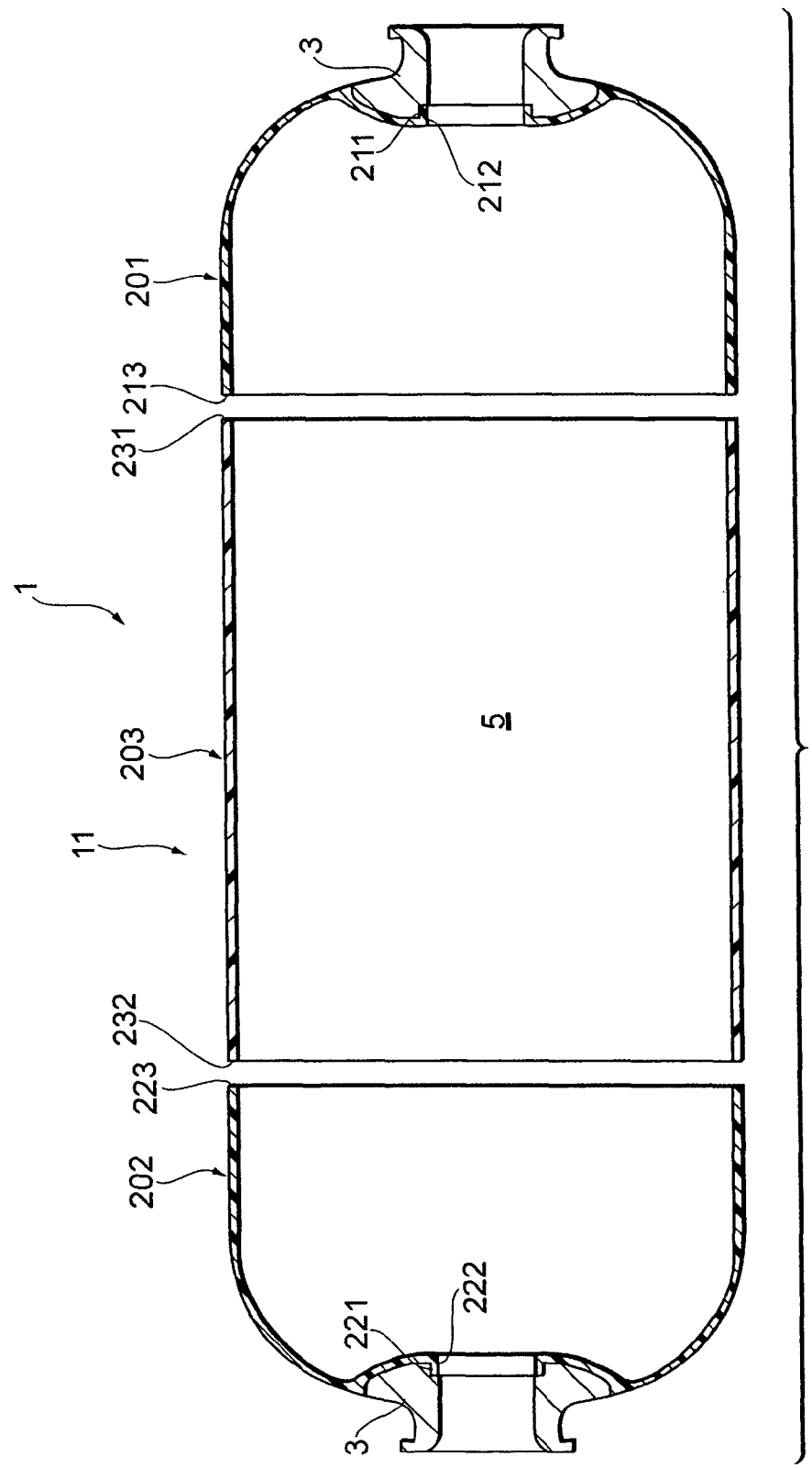
FIG. 11 is a sectional view showing a constitution of a gas container according to fifth and eleventh embodiments.

Next, different respects of a gas container 1 according to a fifth embodiment will mainly be described with reference to FIG. 11. The embodiment is different from the first embodiment in that a resin liner 11 of the gas container 1 includes three liner constituting members 201, 202 and 203. It is to be noted that in FIG. 11, a reinforcement layer 12 is omitted.

The resin liner 11 is constituted by joining, to one another, the three liner constituting members 201, 202 and 203 divided into three members in a longitudinal direction by laser welding. The two liner constituting members 201, 202 positioned at opposite ends are formed into a bowl-like shape as a whole. The liner constituting member 203 positioned at the center is formed into a cylindrical or annular shape as a whole. The two liner constituting members 201, 202 at the opposite ends are integrally molded with mouthpieces 3 by, for example, injection molding, respectively. The central liner constituting member 203 is formed by, for example, the injection molding.

The two liner constituting members 201, 202 at the opposite ends have joining portions 213, 223 on a side opposite to the mouthpieces 3, 3 in addition to return portions 211, 221 and communicating portions 212, 222. The central liner constituting member 203 has joining portions 231, 232 at opposite open end sides in an axial direction.

It is to be noted that these joining portions (213, 223, 231 and 232) are simply constituted of end surfaces crossing the axial direction in the axial direction, but it is preferable to constitute the portions in consideration of an irradiation property of laser and a close contact property due to a differential pressure in the same manner as in the first embodiment.

These joining portions (213, 223, 231 and 232) have laser transmitting or absorbing properties. For example, the two liner constituting members 201, 202 at the opposite ends are made of a laser transmitting thermoplastic resin, and the central liner constituting member 203 is made of a laser absorbing thermoplastic resin. Needless to say, the materials may be reversed, and the liner constituting members 201, 202 and 203 may partially have the laser transmitting or absorbing property. In the resin liner 11, the joining portions 213, 231 are joined to each other by laser welding, and the joining portions 223, 232 are joined to each other by the laser welding.

As a method of producing the gas container 1 of the present embodiment, the producing method of each of the above-mentioned embodiments can be applied. Here, a case where the three liner constituting members 201, 202 and 203 are simultaneously joined by the laser welding will briefly be described.

First, the three liner constituting members 201, 202 and 203 including the liner constituting members (201, 202) provided with the mouthpieces 3 are molded, and these members are arranged in a chamber 101 to bring the joining portions 213, 231 into contact with each other and bring the joining portions 223, 232 into contact with each other, thereby obtaining the tentatively joined resin liner 11.

Subsequently, for example, the inside of the chamber 101 is brought into an inactive gas atmosphere or a vacuum state, a pressure of a substantially sealed space of the resin liner 11 is reduced, or the space is pressurized by a differential pressure generation device (e.g., the negative pressure generation device 120, the heated gas supply device 160 or the heated air supply device 180 of the above embodiments), and a predetermined pressure difference is set between the inside and the outside of the resin liner 11.

Subsequently, while rotating the tentatively joined resin liner 11 around an axis of the liner, or rotating two laser torches 100 around the resin liner 11, the joining portions 213, 231 are joined to each other, and the joining portions 223, 232 are joined to each other over a circumferential direction by the laser welding. In consequence, the three liner constituting members 201, 202 and 203 are integrally joined, and the finally joined resin liner 11 is manufactured. Subsequently, the gas container 1 is produced through predetermined steps (e.g., S7 to S9 of the first embodiment).

Therefore, even when the resin liner 11 includes the three liner constituting members 201, 202 and 203 as in the present embodiment, the gas container 1 can be produced with high productivity in the same manner as in the above embodiments.

It is to be noted that an example in which the three liner constituting members 201, 202 and 203 are simultaneously subjected to treatments such as the tentative joining and the laser welding has been described. However, needless to say, these treatments may separately be performed. A case where three liner constituting members are joined has been described, but this also applies to four or more liner constituting members. That is, the present invention is applicable to the resin liner 11 constituted by joining a plurality of liner constituting members arranged in the axial direction.

Sixth Embodiment

Figure 12:
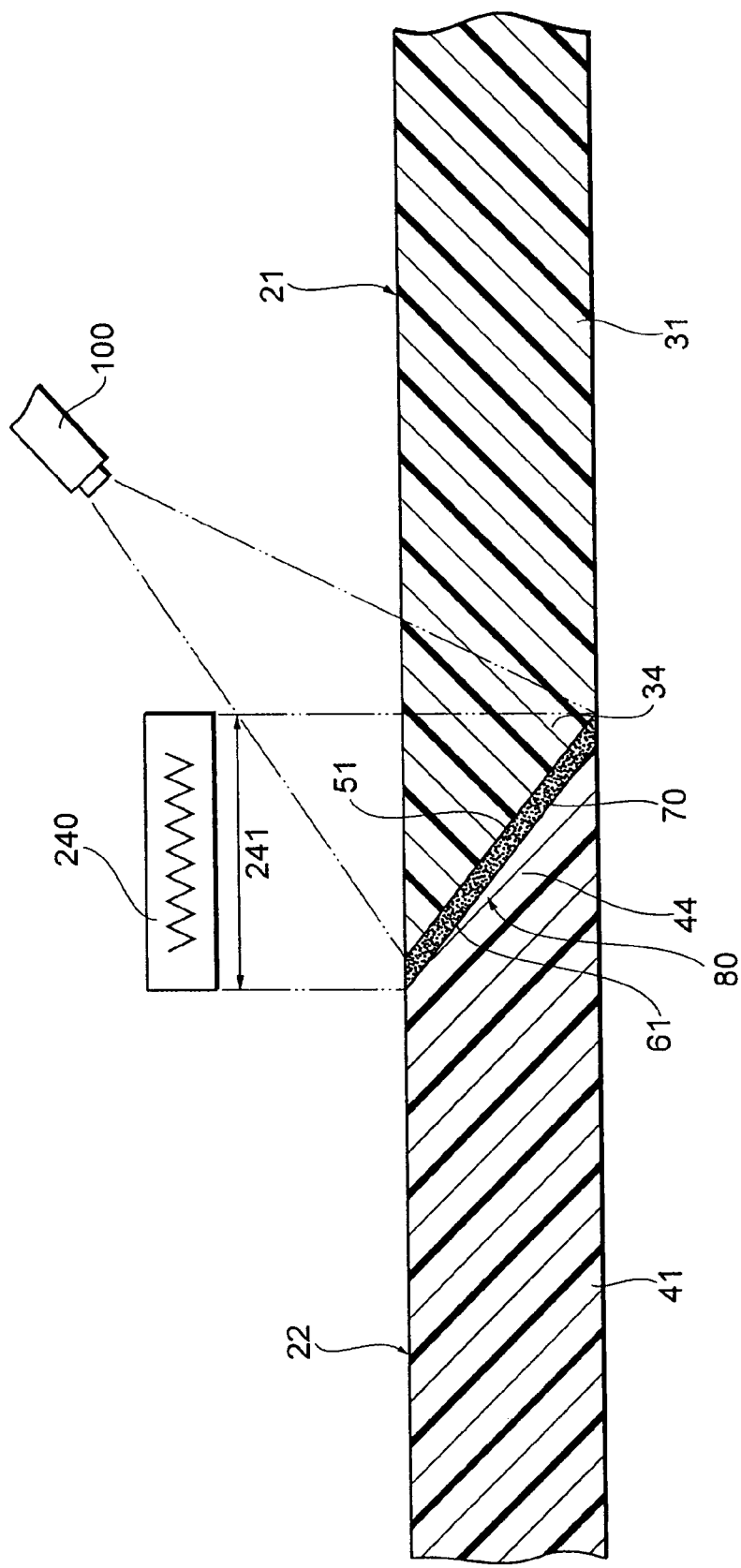
FIG. 12 is an enlarged sectional view showing a join part of a gas container according to a sixth embodiment.
Figure 13:
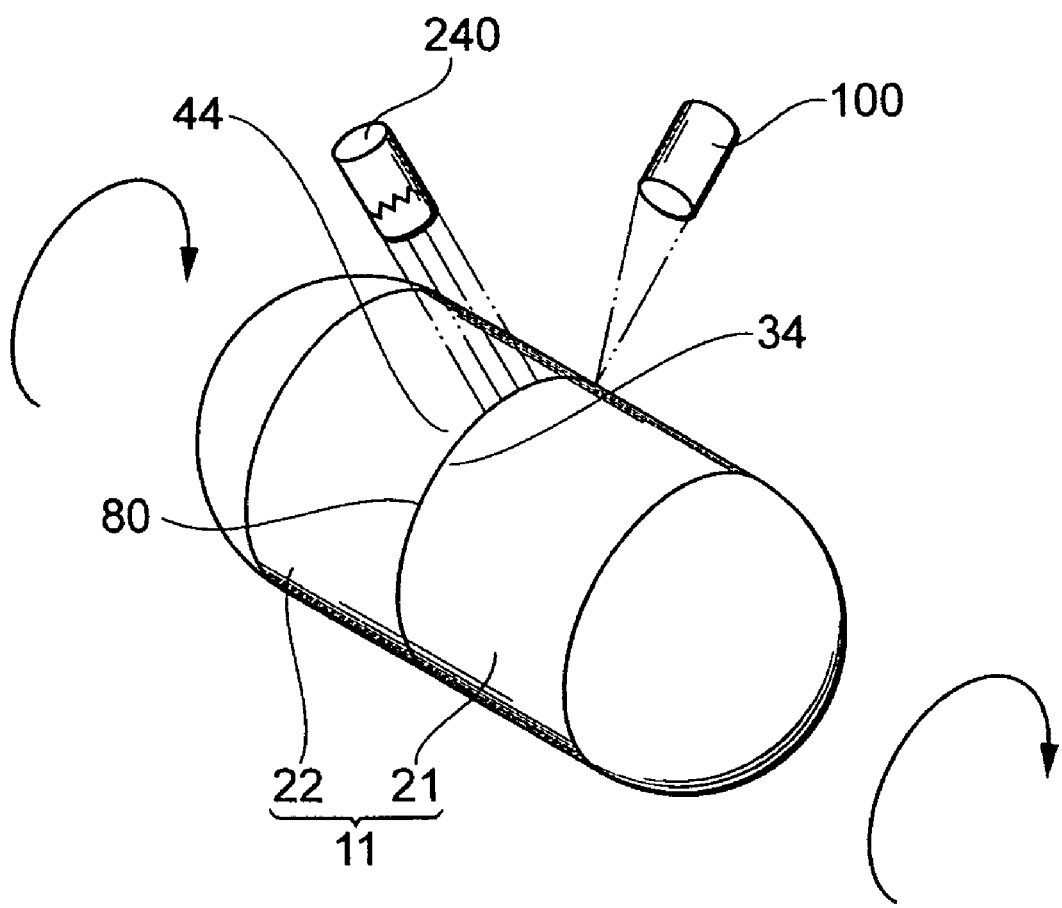
FIG. 13 is a perspective view showing the method of producing the gas container according to the sixth embodiment.
Figure 14:
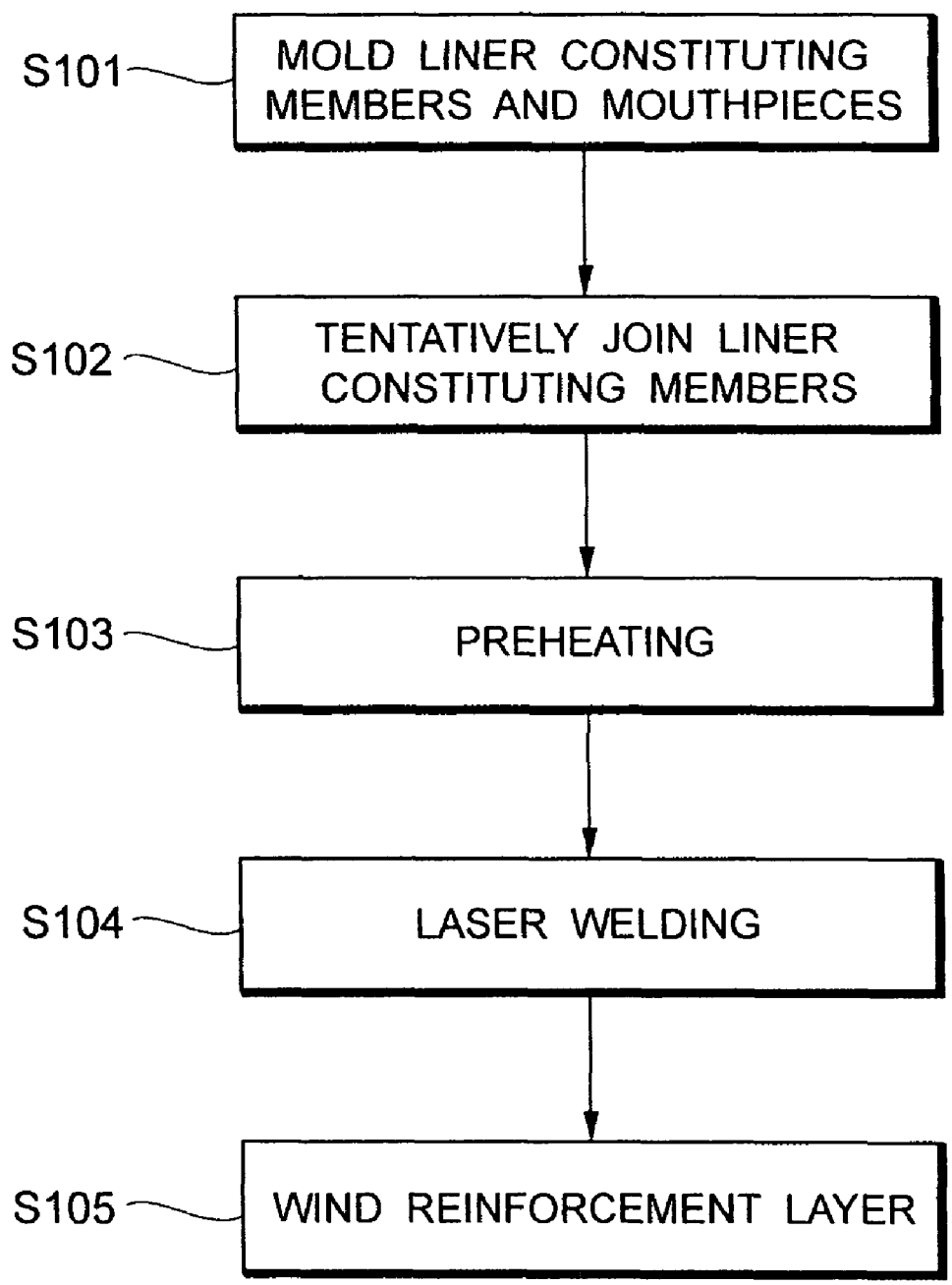
FIG. 14 is a flow chart showing steps of the method of producing the gas container according to the sixth embodiment.

Next, different respects of a gas container 1 according to a sixth embodiment will mainly be described with reference to FIGS. 12 to 14. FIG. 12 is an enlarged sectional view showing a part around joining portions 34, 44 in the same manner as in FIG. 2. However, in FIG. 12, a reinforcement layer 12 is omitted. A constitution of the gas container 1 is different from that of the first embodiment (FIG. 2) in that the joining portions 34, 44 of the sixth embodiment do not have extending portions 52, 62.

A method of producing the gas container 1 will be described with reference to FIGS. 13 and 14.

Steps S101 and S102 are the same as the steps S1 and S2 of the first embodiment, and step S105 is the same as the step S9 of the first embodiment.

First, a pair of liner constituting members 21, 22 and two mouthpieces 3, 3 are molded (step S101). At this time, the liner constituting member 21 and the mouthpiece 3 are integrally molded by injection molding, and the liner constituting member 22 and the mouthpiece 3 are similarly integrally molded. It is to be noted that instead of the injection molding, rotation molding or blow molding may be used. The liner constituting members 21, 22 and the mouthpieces 3, 3 do not have to be integrally molded, and the mouthpieces 3, 3 may be attached to the liner constituting members 21, 22 after a laser welding step (step S105) described later or the like.

Subsequently, the liner constituting members 21, 22 provided with the mouthpieces 3 are arranged with, for example, a laterally directed posture in a manufacturing equipment, and the liner constituting members 21, 22 are butted with each other. Moreover, the joining portions 34, 44 are brought into contact with each other, and joining end surfaces 51, 61 are brought into contact with each other in a circumferential direction (step S102). In consequence, a resin liner 11 having a state in which the liner constituting members 21, 22 are tentatively joined (temporarily joined) is obtained. It is to be noted that subsequently plugs (not shown) may be screwed into and connected to the mouthpieces 3, 3 of the liner constituting members 21, 22 to bring the inside of the tentatively joined resin liner 11 into a substantially sealed state, so that impurities do not enter this sealed space.

In the next step, while the tentatively joined state of the resin liner 11 is maintained and a rotation device (not shown) is driven to rotate the resin liner 11 around an axis of the liner, a heater 240 as a preliminary heating device is driven to preliminarily heat the joining portions 34, 44 brought into contact with each other (step S103). The heater 240 is positioned outside the resin liner 11, and is opposed to a part of the joining portions 34, 44 (a part of a joining boundary between the liner constituting members 21 and 22) in a circumferential direction in a non-contact manner.

Moreover, the heater 240 has a heating region 241 which extends along an axial direction of the resin liner 11 with a length corresponding to a length of both of the joining end surfaces 51, 61 in the axial direction (see FIG. 12). Therefore, when the resin liner 11 is rotated once, the whole surface of the joining end surface 51 and the whole surface of the joining end surface 61 brought into contact with each other are preliminarily heated by the heater 240. It is to be noted that since the joining end surfaces 51, 61 are brought into contact with each other, heat conduction during the preliminary heating is promoted.

It is to be noted that the length of the heater 240 in the axial direction may be set to be shorter than that of the joining end surfaces 51, 61 in the axial direction, and the heating region 241 of the heater 240 may be positioned beyond the opposite joining end surfaces 51, 61 in the axial direction. The heater 240 is positioned outside the resin liner 11, but the heater 240 may be positioned inward from the resin liner 11 to preliminarily heat the joining portions 34, 44 brought into contact with each other from an inner surface side (from an inner part of the resin liner 11). Furthermore, the heater 240 is constituted in the non-contact manner with respect to the resin liner 11, but a preliminary heating device of a contact type may be constituted and brought into contact with an inner or outer surface of a certain joining boundary between the joining portions 34 and 44. For example, when the contact type preliminary heating device is constituted of a roller containing a heater is constituted, a peripheral surface of the heated roller may be brought into contact with the inner or outer surface of the joining boundary. The liner constituting members 21, 22 brought into contact with each other may entirely and preliminarily be heated by the heater 240. However, when the joining portions 34, 44 as targets of laser welding are locally and preliminarily heated, a thermal influence such as thermal deformation of the whole liner constituting member 21 (22) can preferably be suppressed. Moreover, a necessary heat amount can be reduced.

Subsequently, the preliminarily heated joining portions 34, 44 are irradiated with laser (step S104). The irradiation with the laser is performed by driving a laser torch 100 positioned outside the resin liner 11. The joining end surfaces 51, 61 brought into contact with each other are irradiated with the laser externally from the laser transmitting joining portion 34 by the laser torch 100. A resin of the joining end surface 61 is heated and melted by the emitted laser, and a resin of the joining end surface 51 is heated and melted owing to heat conduction. Moreover, when these melted resins are cooled to solidify, a laser welding part 70 is formed to integrally join the joining portions 34, 44 each other.

Here, the irradiation with the laser is performed by rotating the tentatively joined resin liner 11 around an axis in the same manner as in the preliminary heating. Therefore, the laser welding part 70 is formed over the circumferential direction of the resin liner 11.

In the present embodiment, the laser torch 100 is disposed on a downstream side of the heater 240 in a rotating direction around the axis of the tentatively joined resin liner 11. Therefore, the preliminarily heated portions of the joining portions 34, 44 opposed to the heater 240 are irradiated with the laser from the laser torch 100 as desired. Therefore, when the resin liner 11 is rotated at least once, the joining portions 34, 44 are preliminarily heated and irradiated with the laser over the circumferential direction.

As described above, since the preliminarily heated joining end surfaces 51, 61 are successively irradiated with the laser to join the joining end surfaces 51, 61 to each other by the laser welding, the joining portions 34, 44 can be subjected to the laser welding in a state in which a drop of the preliminary heating temperature of the joining portions 34, 44 is minimized.

Moreover, since the preliminarily heated joining portions are irradiated with the laser, the portions of the resin liner 11 irradiated with the laser can be inhibited from being burnt, and a joining defect and a strength drop of the resin liner 11 can be suppressed.

Furthermore, since the preliminarily heated joining end surfaces 51, 61 are warmed, a time required for the laser welding can be reduced. Furthermore, since the preliminary heating is performed, an output of laser does not have to be increased more than necessary even in a case where the laser transmitting joining portion 34 is made of a resin having a low laser transmitting property or formed to be thick.

It is to be noted that as the laser emitted by the laser torch 100, semiconductor laser or the like may be used, but the present invention is not limited to this embodiment, and a type of the laser is appropriately selected in consideration of properties including the thickness of the resin of the laser transmitting liner constituting member 21. Various conditions such as an output (a heating temperature, a heating amount and a heating time) of the heater 240, an output of the laser (an irradiation amount, an irradiation time) and a rotation speed of the resin liner 11 may appropriately be set in accordance with the properties of the liner constituting members 21, 22 and the joining portions 34, 44. In this case, the preliminary heating temperature of the joining portions 34, 44 may be set to be lower than a final heating temperature at which the portions are heated by the laser and start to be melted.

Also, during execution of the above-mentioned preliminary heating step (step S103), the irradiation with the laser is performed to execute a laser welding step (step S104). However, needless to say, after preliminarily heating the joining portions 34, 44 over the circumferential direction, the irradiation with the laser may be started. It is to be noted that in the above description, the joining portions 34, 44 are irradiated with the laser externally from the resin liner 11, but the laser torch 100 is disposed inward from the resin liner 11 to irradiate the joining portions 34, 44 with the laser inward from the resin liner 11.

Moreover, instead of a constitution in which the resin liner 11 is directly rotated, the heater 240 and the laser torch 100 may directly be rotated around the resin liner 11. Instead, the resin liner 11, the heater 240 and the laser torch 100 may all be rotated in the same direction or a reverse direction. Needless to say, when the resin liner 11 only is rotated as described above, device constitutions can be simplified as compared with a case where the heater 240 and the laser torch 100 are associated and rotated.

When the laser welding is completed, the resin liner 11 is brought from a tentatively joined state to a finally joined state (i.e., a completely joined state) to constitute a storage space 5 in a hollow inner part as described above.

Moreover, as a step after the completion of the laser welding, a step of forming the reinforcement layer 12 on an outer surface of the resin liner 11 by a filament winding process or the like (step S105) is executed. In consequence, the gas container 1 is produced.

As described above, according to the method of producing the gas container 1 of the present embodiment, since the joining portions 34, 44 as the targets of the laser welding are preliminarily heated prior to the laser welding, the portions of the resin liner 11 can be inhibited from being burnt during the laser irradiation, and the liner constituting members 21, 22 can be joined to each other with satisfactory joining precision in a short time.

Seventh Embodiment

Figure 15:
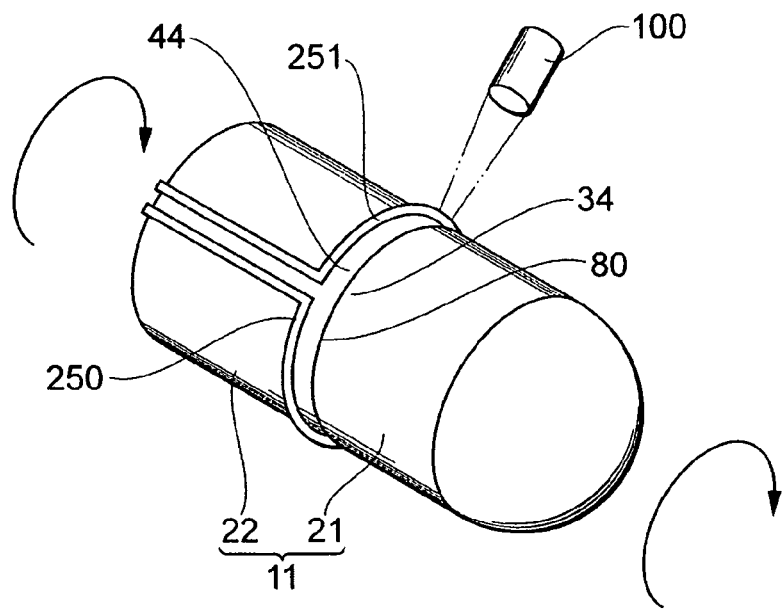
FIG. 15 is a perspective view showing a method of producing a gas container according to a seventh embodiment.

Next, different respects of a method of producing a gas container 1 according to a seventh embodiment will mainly be described with reference to FIG. 15. The embodiment is different from the sixth embodiment in that a heater 250 as a preliminary heating device is formed to be coiled.

The heater 250 of the present embodiment has an annular heater section 251 which preliminarily heats joining portions 34, 44 externally from a resin liner 11. The annular heater section 251 is opposed to a joining boundary between the joining portions 34 and 44 brought into contact with each other in a non-contact manner substantially over a circumferential direction of the resin liner 11. Therefore, even if the resin liner 11 is not relatively rotated with respect to the heater 250, the joining portions 34, 44 can preliminarily be heated substantially over the circumferential direction by the annular heater section 251. The annular heater section 251 has a heating region which extends in an axial direction of the resin liner 11 with, for example, a length corresponding to a length of opposite joining end surfaces 51, 61 in the axial direction in the same manner as in the heater 240 described above.

Even according to the present embodiment, when the joining portions 34, 44 preliminarily heated by the heater 250 are irradiated with laser, a disadvantage such as burnt-out can be suppressed, and the joining portions 34, 44 can appropriately be joined to each other with laser welding.

It is to be noted that various modifications are applicable even to the present embodiment in the same manner as in the sixth embodiment. For example, during heat generation of the heater 250 (i.e., during preliminary heating), rotation of the resin liner 11 around an axis is started, and the irradiation with laser may be started in synchronization with this rotation. Moreover, instead of rotating the resin liner 11, the laser torch 100 may be rotated around the resin liner 11.

Eighth Embodiment

Figure 16:
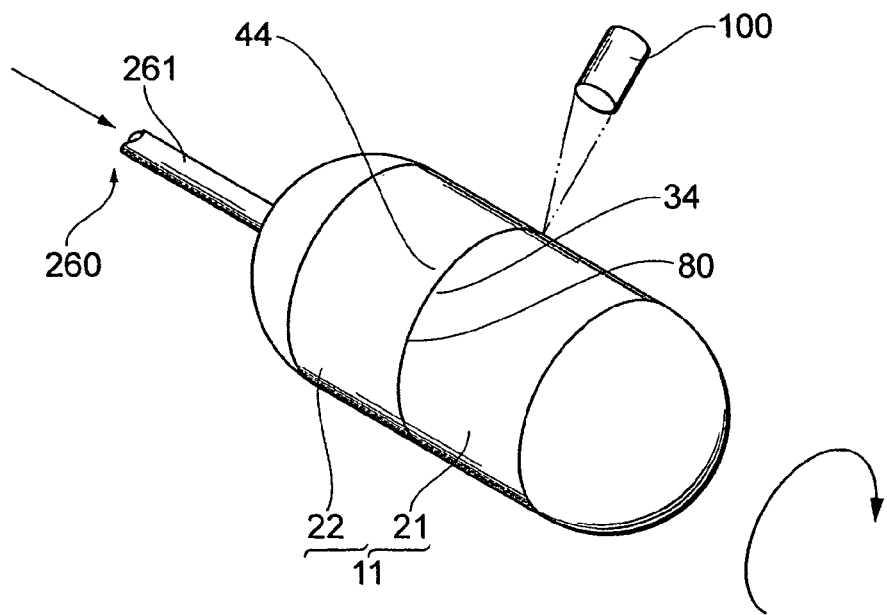
FIG. 16 is a perspective view showing a method of producing a gas container according to an eighth embodiment.

Next, different respects of a method of producing a gas container 1 according to an eighth embodiment will mainly be described with reference to FIG. 16. The embodiment is different from the sixth embodiment in that a hot air device 260 is used as a preliminary heating device which replaces the heater 240.

The hot air device 260 includes, for example, a heat source (not shown), a blower (not shown) which blows hot air such as air passed through the heat source or an inactive gas, and a duct 261 which introduces the hot air from the blower into a tentatively joined resin liner 11. The duct 261 is screwed into and connected to, for example, one mouthpiece 3 of the resin liner 11.

In this case, a downstream end of the duct 261 extends in the resin liner 11 so as to blow the hot air from the resin liner 11 to a joining boundary between joining portions 34 and 44 or near the boundary. Needless to say, the downstream end of the duct 261 may be positioned at the center of the mouthpiece 3 or the resin liner 11 so as to preliminarily heat an inner part of the resin liner 11 as a whole with the hot air. In this whole preliminary heating, a mouthpiece 3 opposite to the mouthpiece 3 connected to the duct 261 of the resin liner 11 is closed with a plug. In consequence, heat is not released from the resin liner 11 as much as possible.

As described above, even according to the present embodiment, the joining portions 34, 44 preliminarily heated by the hot air device 260 can be irradiated with laser. In consequence, a disadvantage such as a burnt-out state is suppressed, and the joining portions 34, 44 can appropriately be joined by laser welding. Especially, when the heated inactive gas is used as the hot air, oxidation between the joining portions 34 and 44 can be suppressed during the laser welding.

Moreover, as a modification, in the same manner as in the above embodiments, driving of the hot air device 260 may be stopped during the laser welding. Alternatively, the driving may be continued to continue the preliminary heating. The resin liner 11 may be rotated during the preliminary heating when the hot air device 260 is driven, but when the hot air from the duct 261 is blown to the joining boundary between the joining portions 34 and 44 or near boundary over the circumferential direction, the resin liner 11 does not have to be rotated during the preliminary heating.

Ninth Embodiment

Next, different respects of a method of producing a gas container 1 according to a ninth embodiment will mainly be described with reference to FIGS. 17A and 17B. The embodiment is different from the sixth embodiment in that a heat generating material 270 is disposed at an interface between joining portions 34 and 44. It is to be noted that FIGS. 17A and 17B are sectional views showing an enlarged join part 80 of the gas container 1 in the same manner as in FIG. 12.

The heat generating material 270 is disposed at the whole surface of a joining end surface 61 of a laser absorbing liner constituting member 22. Needless to say, the heat generating material 270 may partially be disposed at the joining end surface 61. Instead of this constitution, the heat generating material 270 may be disposed over the whole surface of a laser absorbing joining end surface 51, or at both of the joining end surfaces 51, 61.

Any material may be used as the heat generating material 270 as long as the material has a heat generating property higher than that of a resin of the joining end surface 61. For example, the heat generating material 270 may be made of one of a ceramic, graphite, a resin and a metal, and these materials may be mixed to constitute the heat generating material. When the heat generating material 270 is disposed at the joining end surface 61, heat generating fine particles may be mixed with a volatile solvent and applied to the whole joining end surface 61, and a sheet in which the heat generating material 270 is kneaded may be attached to the whole joining end surface 61.

To produce the gas container 1 of the present embodiment, the heat generating material 270 is disposed at the joining end surface 61 by application or the like, before butting a liner constituting member 21 and the liner constituting member 22 with each other to tentatively join the members to each other. That is, producing steps of the gas container 1 of the present embodiment include a step of disposing the heat generating material 270 at the joining end surface 61 between steps corresponding to the steps S101 and S102 shown in FIG. 14 described in the sixth embodiment.

After the step of disposing this heat generating material 270, a resin liner 11 is tentatively joined to preliminarily heat the joining portions 34, 44 brought into contact with each other and join the portions to each other by laser welding. The preliminary heating is performed using, for example, a preliminary heating device (240, 250 or 260) of the sixth to eighth embodiments. When the laser welding is completed, the join part 80 of the resin liner 11 constituted by integrally joining the joining portions 34, 44 has the heat generating material 270 near a laser welding part 70 (see FIG. 17B).

The present embodiment is useful for the sixth to eighth embodiments firstly in that heat generation between the joining end surfaces 51 and 61 during the preliminary heating is promoted by the heat generating material 270. Therefore, the preliminary heating can be performed in a short time. Secondly, melting of the joining end surfaces 51, 61 is similarly promoted by the heat generating material 270 during the laser welding. Therefore, a welding defect between the joining portions 34 and 44 can be suppressed to further satisfactorily join the portions to each other.

It is to be noted that the heat generating material 270 is disposed integrally with the laser welding part 70 by the laser welding in some case. For example, when the resin of the joining end surface 61 is irradiated with laser and melted and the heat generating material 270 is mixed in the resin, the heat generating material 270 is sometimes included in the resin melted to solidify (i.e., the laser welding part 70).

It is to be noted that in the present embodiment, in a case where the heat generating material 270 is a conductive ceramic or the like and the heat generating material 270 has conductivity in this manner, instead of the preliminary heating device of the sixth to eighth embodiments, a high-frequency induction heating device which also serves as the preliminary heating device may be used.

A method of producing the gas container 1 by use of the high-frequency induction heating device will briefly be described. In this producing process, first in the step S102 of FIG. 14, the tentatively joined resin liner 11 is installed in a high-frequency furnace of the high-frequency induction heating device, and a laser torch 100 is installed at a predetermined position in this high-frequency furnace. When the high-frequency induction heating device is driven, heat is generated in the heat generating material 270 by induction heating at a high frequency, and the joining end surfaces 51, 61 are preliminarily heated. During the driving of this high-frequency induction heating device, the laser torch 100 is driven to join the joining end surfaces 51, 61 to each other by laser welding.

As described above, when the joining end surface 61 is provided with the conductive heat generating material 270 and the high-frequency induction heating device is used, the joining end surfaces 51, 61 can preliminarily be heated in a shorter time. Moreover, melting of the joining end surfaces 51, 61 can be promoted. Therefore, a welding defect between the joining portions 34 and 44 can be suppressed to further satisfactorily join the portions to each other.

Moreover, during the laser welding, the laser welding part 70 can be kept at a predetermined temperature by the induction heating at the high frequency. Therefore, a quality of the resin liner 11 can be stabilized. Furthermore, an effect similar to that of an annealing treatment can be obtained in the resin liner 11 itself owing to the induction heating at the high frequency,

Tenth Embodiment

Next, different respects of a method of producing a gas container 1 according to a tenth embodiment will mainly be described with reference to FIG. 18. The embodiment is different from the ninth embodiment in that a pressurizing jig 290 is installed in a high-frequency furnace 281 of a high-frequency induction heating device 280.

The pressurizing jig 290 is constituted of a pair of jigs disposed so as to face each other via joining portions 34, 44 so that, for example, a tentatively joined resin liner 11 is attached under pressure inward from opposite end sides. A pair of pressurizing jigs 290, 290 apply a close contact force to the resin liner 11 inward in an axial direction to strongly bring joining end surfaces 51, 61 into close contact with each other. The pair of pressurizing jigs 290, 290 may have an actuator such as a cylinder as a driving source, or may not have any actuator, According to the present embodiment, induction heating at a high frequency and laser welding can be performed in a state in which the close contact force between the joining end surfaces 51 and 61 is increased by a pair of pressurizing jigs 290, 290. In consequence, a joining property between the joining end surfaces 51 and 61 subjected to the laser welding can be improved, and joining strength and air-tightness of the resin liner 11 can further be secured.

It is to be noted that instead of a mechanical close contact force obtained by the pair of pressurizing jigs 290, 290, the tentatively joined joining end surfaces 51, 61 may strongly be attached to each other owing to another structure such as frictional close contact.

Eleventh Embodiment

Next, different respects of a method of producing a gas container 1 according to an eleventh embodiment will mainly be described with reference to FIG. 11.

As described above in the fifth embodiment, a resin liner 11 of the gas container 1 includes three liner constituting members 201, 202 and 203. This method of producing the gas container 1 may be performed as follows, in a case where the three liner constituting members 201, 202 and 203 are simultaneously subjected to preliminary heating and laser welding.

First, the joining portions 213, 231 are brought into contact with each other, and the joining portions 223, 232 are brought into contact with each other to manufacture the tentatively joined resin liner 11. Subsequently, while rotating the tentatively joined resin liner 11 around an axis of the liner, the joining portions 213, 231 are joined to each other, and the joining portions 223, 232 are joined to each other over the circumferential direction by the laser welding during or after the preliminary heating. It is to be noted that, instead of the rotating the resin liner 11, two preliminary heating devices (e.g., heaters 240, 250) and two laser torches 100 may be rotated around the resin liner 11.

In consequence, the three liner constituting members 201, 202 and 203 are integrally joined, and the finally joined resin liner 11 is manufactured. Subsequently, a reinforcement layer is wound around an outer periphery of the three liner constituting members 201, 202 and 203 to produce the gas container 1.

Therefore, even when the three liner constituting members 201, 202 and 203 constitute the resin liner 11 as in the present embodiment, the gas container 1 satisfactorily joined by the laser welding can be produced in the same manner as in the above embodiments.

It is to be noted that an example in which the three liner constituting members 201, 202 and 203 are simultaneously subjected to treatments such as the preliminary heating and the laser welding has been described. However, needless to say, these treatments may separately be performed. A case where three liner constituting members are joined has been described, but this also applies to four or more liner constituting members. That is, the present invention is applicable to the resin liner 11 constituted by joining a plurality of liner constituting members arranged in the axial direction.

Twelfth Embodiment

Next, different respects of a method of producing a gas container 1 according to a twelfth embodiment will mainly be described with reference to FIGS. 19 and 20. The embodiment is different from the sixth embodiment in that the laser torch 100 also serves as a preliminary heating device and that a non-contact type of water content measurement device 300 which measures a water content is disposed.

The water content measurement device 300 measures a water content ratio of liner constituting members 21, 22. The water content measurement device 300 is positioned outside a resin liner 11, and opposed to a part of joining portions 34, 44 in a circumferential direction (a part of a joining boundary between the liner constituting members 21 and 22) in a non-contact manner. Therefore, the water content measurement device 300 measures the water content ratio of the joining portion 34 or 44.

As the water content measurement device 300, various known devices such as a dew-point instrument and an infrared spectrometer may be used, and a microwave water content meter is used in the present invention. When the resin liner 11 is rotated around an axis once by a rotation device (not shown), the water content measurement device 300 can measure the water content ratio of the joining portion 34 or the joining portion 34 over the circumferential direction.

Figure 19:
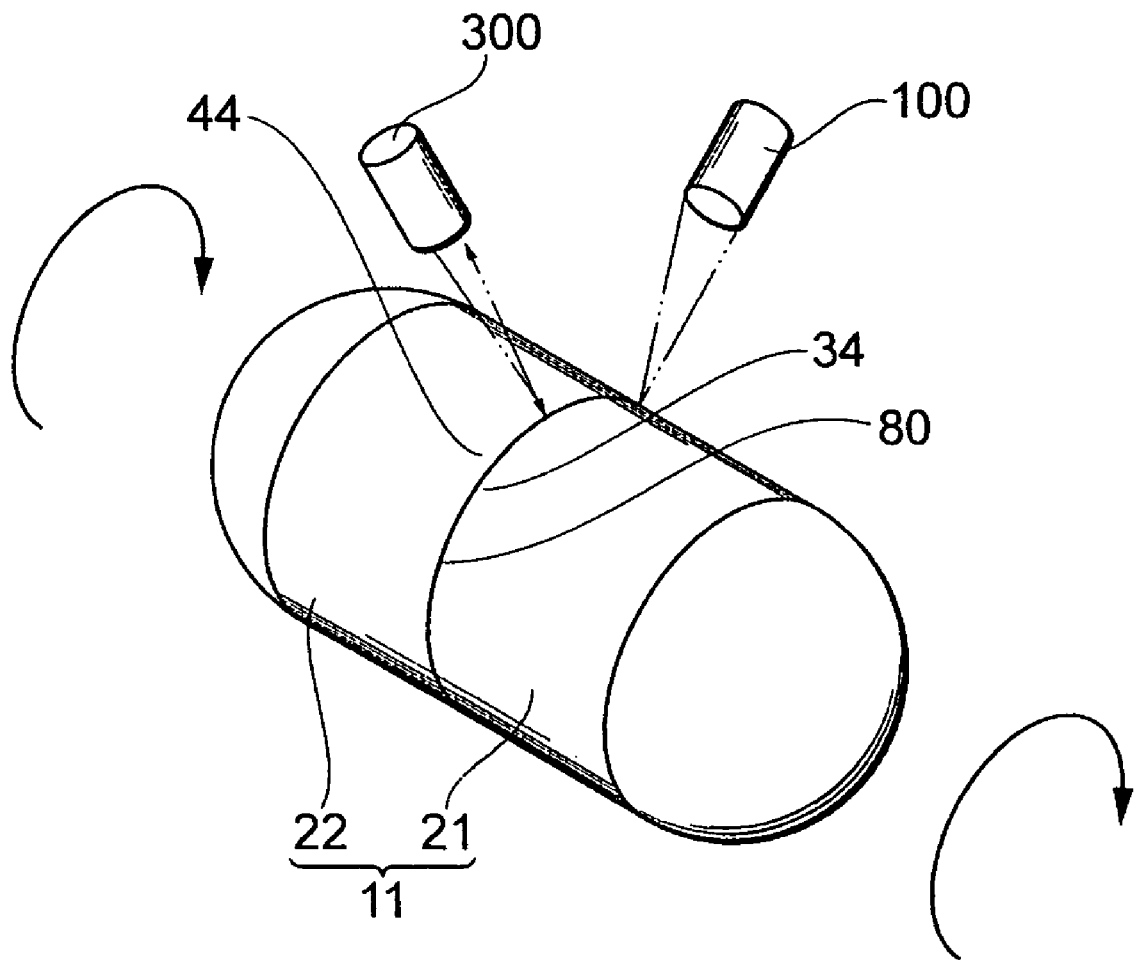
FIG. 19 is a perspective view showing a method of producing a gas container according to a twelfth embodiment.
Figure 20:
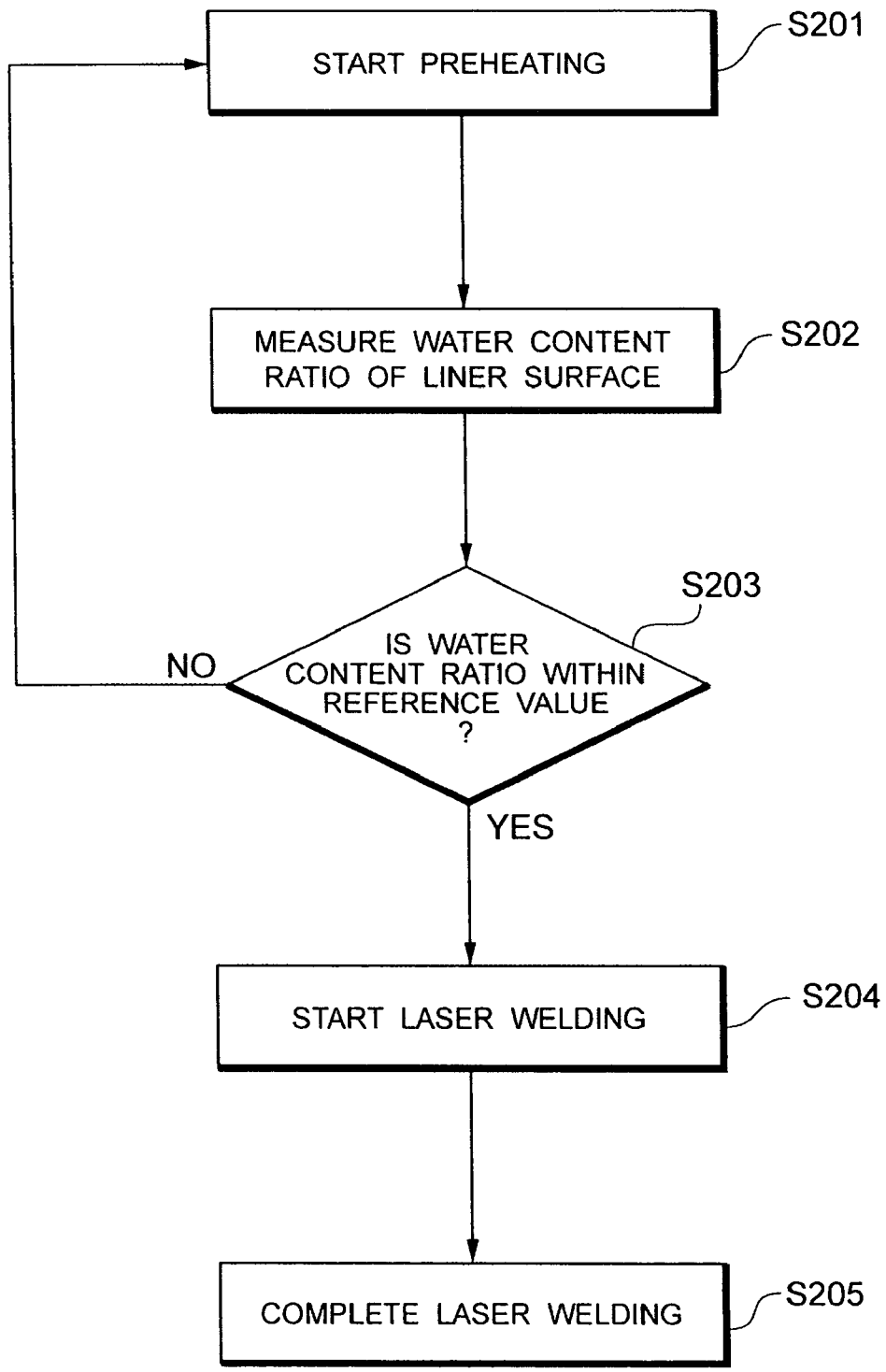
FIG. 20 is a flow chart showing steps of a method of producing the gas container according to the twelfth embodiment.

FIG. 19 is a flow chart showing steps of preheating to laser welding completion. These steps correspond to a preheating step (step S33) and a laser welding step (step S104) shown in FIG. 14 of the sixth embodiment.

In step S201, while the tentatively joined resin liner 11 is rotated by the rotation device, a laser torch 100 is driven to preliminarily heat the joining portions 34, 44 brought into contact with each other. At this time, an output of laser by the laser torch 100 is set to such an extent that the joining portions 34, 44 are not laser welding. That is, the output of laser during the preliminary heating is set to be lower than that during final heating (the heating for the laser welding).

While executing the preliminary heating, the water content ratio of the liner constituting members 21, 22 is measured by the water content measurement device 300 (step S202). Here, when the water content ratio exceeds a reference value (step S203; No), the preliminary heating is continued by the laser torch 100, and removal of the water content of the joining portions 33, 34 by the preliminary heating is continued. The reference value of the water content ratio is set to, for example, 0.2%.

On the other hand, when the water content ratio is less than the reference value (step S203; Yes), the laser torch 100 shifts from the preliminary heating to the final heating, and the laser welding between the joining portions 34, 44 is started (step S204). Moreover, in the same manner as in the above embodiment, when the laser welding is completed (step S205), the resin liner 11 is changed from the tentatively joined state to the finally joined state.

As described above, in the present embodiment, the preliminary heating is performed according to a measurement result of the water content measurement device 300, and the water content ratio of the joining portions 34, 44 can be reduced to the predetermined reference value. In consequence, when the water content ratio of the joining portions 34, 44 drops to such a water content ratio that any welding defect is not generated, the laser welding can be started, and the laser welding can be performed with high robust property. Through all of the producing steps, humidity of the liner constituting members 21, 22 can easily be controlled. Furthermore, since the laser torch 100 also serves as the preliminary heating device, the whole producing device constitution can be simplified.

It is to be noted that to perform the preliminary heating in accordance with the measurement result of the water content measurement device 300 is also effective for a preliminary heating device other than the laser torch 100, and can be applied to the above embodiments.

Another Embodiment

The method of producing the gas container 1 of the present invention described in the sixth to twelfth embodiments can be carried out using various producing equipment, and the producing equipment described in the first to fourth embodiments may appropriately be used.

For example, the tentatively joined resin liner 11 of the sixth embodiment is arranged in a chamber, the inside of the chamber is brought into an inactive gas atmosphere or a vacuum state, and joining portions 34, 44 may be subjected to preliminary heating and/or laser welding. In consequence, since the preliminary heating and/or the laser welding are performed under a low oxygen atmosphere as compared with atmospheric air, oxidation of the joining portions 34, 44 can be suppressed, and joining precision can further be improved.

Moreover, a pressure difference may be applied between the inside and the outside of the resin liner 11 during the laser welding to improve a close contact property between joining end surfaces 51 and 61. The pressure difference may be applied by reducing an inner pressure of the resin liner 11 via a mouthpiece 3 of the resin liner 11 or pressurizing the liner by use of, for example, a pump. In consequence, even if the pressurizing jigs described in the tenth embodiment are obviated or simplified, the joining end surfaces 51, 61 can be joined by the laser welding in a state in which a close contact force between the joining end surfaces 51 and 61 is improved.

INDUSTRIAL APPLICABILITY

Laser welding described for a gas container 1 of the present invention described above is applicable to not only a resin liner 11 but also various resin molded members such as a car component and a pipe component. For example, even when an intake manifold is constituted of a plurality of resin molded members to join the resin molded members to each other by the laser welding, a structure of joining portions, application of a pressure difference during the laser welding, an inactive gas atmosphere or a vacuum state during the laser welding, preliminary heating prior to a laser welding step, addition of a heat generating material 270 to a laser welding part 70 and the like can be applied to improve joining precision.

The invention claimed is:

1. A method of producing a gas container having a resin liner constituted by joining a plurality of liner constituting members, the liner constituting members each having at least a tubular part, the method comprising: providing the plurality of resin liner constituting members,
   the plurality of resin liner constituting members including a first liner constituting member having a first joining portion and a second liner constituting member having a second joining portion, the first joining portion having an inward chamfered first joining end surface, and a first extending portion extending externally from a tip end portion of the first joining end surface, the second joining portion having a second joining end surface externally chamfered along the first joining end surface;
   a first step of constituting the first joining end surface by a laser transmitting member and constituting the second joining end surface by a laser absorbing member;
   a second step of bringing the first joining end surface into contact with the second joining end surface and bringing the first extending portion into contact with an outer peripheral surface of the second joining portion after the first step; and
   a third step of irradiating the liner constituting members with laser from a side of the first joining portion to join the first joining end surface and the second joining end surface by laser welding which are brought into contact with each other after the second step; and
   a step of shaving the first extending portion so that joints of outer peripheral surfaces of the first and second liner constituting members have the same plane after the third step.

2. The method of producing the gas container according to claim 1, wherein the second step is performed by externally bringing the first joining portion into contact with the second joining portion, and
   the third step is performed by irradiating the liner constituting members with the laser from the side of the first joining portion by a laser irradiation device arranged outside the first and second liner constituting members.

3. The method of producing the gas container according to claim 1, wherein the third step includes irradiating the liner constituting members with the laser in a state in which a pressure difference is applied between the inside and the outside of the first and second liner constituting members.

4. The method of producing the gas container according to claim 3, wherein the application of the pressure difference in the third step is performed by regulating at least one of an inner pressure and an outer pressure of the first and second liner constituting members.

5. The method of producing the gas container according to claim 4, wherein the application of the pressure difference in the third step is performed by bringing the first and second liner constituting members into a substantially internally sealed state to reduce a pressure of a substantially sealed space or pressurize the sealed space.

6. The method of producing the gas container according to claim 5, wherein the application of the pressure difference in the third step is performed by reducing the pressure of the sealed space or pressurizing the sealed space via a communicating portion disposed on at least one of the first and second liner constituting members.

7. The method of producing the gas container according to claim 1, wherein the second step is performed by overlapping and arranging the first joining portion and the second joining portion in an axial direction of the first and second liner constituting members, and bringing overlapped portions of the joining portions into contact with each other.

8. The method of producing the gas container according to claim 1, further comprising, between the second step and the third step, a step of performing an annealing treatment in a state in which the first joining portion and the second joining portion are brought into contact with each other.

9. The method of producing the gas container according to claim 1, wherein the third step is performed by subjecting, to the laser welding, the first joining end surface and the second joining end surface brought into contact with each other over a circumferential direction of the first and second liner constituting members while relatively rotating the first and second liner constituting members with respect to the laser irradiation device.

10. The method of producing the gas container according to claim 1, wherein the third step is performed in a low oxygen atmosphere.

11. The method of producing the gas container according to claim 1, wherein the first step is performed by constituting the first liner constituting member by a laser transmitting member, and constituting the second liner constituting member by a laser absorbing member.

12. A method of producing the gas container having a resin liner constituted by joining a plurality of liner constituting members, the liner constituting members each having at least a tubular part, the method comprising: providing the plurality of resin liner constituting members, the plurality of resin liner constituting members including a first liner constituting member having a first joining portion and a second liner constituting member having a second joining portion, the first joining portion having an inward chamfered first joining end surface and a first extending portion extending externally from a tip end portion of the first joining end surface, the second joining portion having a second joining end surface externally chamfered along the first joining end surface and a second extending portion extending from a tip end portion of the second joining end surface;

a first step of constituting the first joining end surface by a laser transmitting member and constituting the second joining end surface by a laser absorbing member;

a second step of bringing the first joining end surface into contact with the second joining end surface, bringing the first extending portion into contact with an outer peripheral surface of the second joining portion, and bringing the second extending portion into contact with an inner peripheral surface of the first joining portion after the first step; and irradiating the liner constituting members from a side of the first joining portion with laser to join the first joining end surface and the second joining end surface by laser welding which are brought into contact with each other after the second step.

13. The method of producing the gas container according to claim 1, further comprising, before the third step, a preliminary heating step of preliminarily heating at least one of the first and second liner constituting members to vaporize a water content.

14. The method of producing the gas container according to claim 13, wherein the preliminary heating step is performed by preliminarily heating at least one of the first and second joining portions.

15. The method of producing the gas container according to claim 14, wherein the preliminary heating step is performed by preliminarily heating the first and second joining portions brought into contact with each other.

16. The method of producing the gas container according to claim 15, wherein the preliminary heating step is performed by heating the first and second joining portions brought into contact with each other from at least one of the inside and the outside of the first and second liner constituting members brought into contact with each other.

17. The method of producing the gas container according to claim 16, wherein the preliminary heating step is performed by preliminarily heating the first and second joining portions brought into contact with each other over a circumferential direction while relatively rotating the first and second liner constituting members brought into contact with each other with respect to a preliminary heating device having a heat source.

18. The method of producing the gas container according to claim 17, wherein the third step is performed by irradiating the first and second joining portions brought into contact with each other with the laser over a circumferential direction while relatively rotating the first and second liner constituting members brought into contact with each other with respect to a laser irradiation device which irradiates the portions with the laser.

19. The method of producing the gas container according to claim 18, wherein the preliminary heating device is positioned on an upstream side of the laser irradiation device in a rotating direction of the first and second liner constituting members brought into contact with each other.

20. The method of producing the gas container according to claim 13, wherein the preliminary heating device which executes the preliminary heating step is at least one of a heater, a hot air device, a high-frequency induction heating device and the laser irradiation device.

21. The method of producing the gas container according to claim 13, further comprising, prior to the preliminary heating step, a step of disposing a heat generating material on at least one of the first joining portion and the second joining portion.

22. The method of producing the gas container according to claim 21, wherein the heat generating material is at least one of a ceramic, graphite, a resin and a metal.

23. The method of producing the gas container according to claim 13, wherein the preliminary heating step is performed by preliminarily heating the joining portions based on a measurement result of a water content measurement device which measures a water content of the first and second joining portions.

24. The method of producing the gas container according to claim 12, further comprising, after the third step, a step of shaving the first extending portion so that joints of outer peripheral surfaces of the first and second liner constituting members have the same plane.

25. The method of producing the gas container according to claim 1, wherein the gas container is constituted so that a high-pressure combustible gas is stored.

26. The method of producing the gas container according to claim 1, further comprising, after shaving the first extending portion, a step of arranging a reinforcement layer on an outer periphery of the resin liner.

27. The method of producing the gas container according to claim 24, further comprising, after shaving the first extending portion, a step of arranging a reinforcement layer on an outer periphery of the resin liner.

28. The method of producing the gas container according to claim 1, wherein the second joining portion has a second extending portion extending inward from a tip end portion of the second joining end surface, and in the second step, the second extending portion is brought into contact with an inner peripheral surface of the first joining portion.

29. The method of producing the gas container according to claim 1, further comprising, before the third step, a preliminary heating step of preliminarily heating at least one of the first and second liner constituting members to vaporize a water content.

30. The method of producing the gas container according to claim 29, wherein a preliminary heating device which executes the preliminary heating step is at least one of a heater, a hot air device, a high-frequency induction heating device or a laser irradiation device.

31. The method of producing the gas container according to claim 29, further comprising, prior to the preliminary heating step, a step of disposing a heat generating material on at least one of the first joining portion and the second joining portion.

32. The method of producing the gas container according to claim 29, wherein the preliminary heating step is performed by preliminarily heating the joining portion based on a measurement result of a water content measurement device which measures the water content of the first and second joining portions.

* * * * *